(12) United States Patent  
Liu

(10) Patent No.: US 12,135,692 B2
(45) Date of Patent: Nov. 5, 2024

(54) FILE SHARING METHOD OF MOBILE TERMINAL AND DEVICE

(71) Applicant: Huawei Technologies Co., Ltd., Shenzhen (CN)

(72) Inventor: Bin Liu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 90 days.

(21) Appl. No.: 17/680,908

(22) Filed: Feb. 25, 2022

(65) Prior Publication Data

US 2022/0179827 A1    Jun. 9, 2022

Related U.S. Application Data

(63) Continuation of application No. PCT/CN2020/111773, filed on Aug. 27, 2020.

(30) Foreign Application Priority Data

Aug. 30, 2019   (CN) .......................... 201910817810.9

(51) Int. Cl.
*G06F 15/16*   (2006.01)
*G06F 3/0485*   (2022.01)
*G06F 3/04883*   (2022.01)
*G06F 16/16*   (2019.01)
*G06F 16/176*   (2019.01)
*H04L 67/06*   (2022.01)

(52) U.S. Cl.
CPC .......... *G06F 16/176* (2019.01); *G06F 3/0485* (2013.01); *G06F 3/04883* (2013.01); *G06F 16/168* (2019.01); *H04L 67/06* (2013.01)

(58) Field of Classification Search
CPC ...... G06F 16/16; G06F 16/168; G06F 16/176; G06F 3/0485; G06F 3/04883; H04L 67/06
USPC .................................................. 709/201–202
See application file for complete search history.

(56) References Cited

U.S. PATENT DOCUMENTS

| 8,866,748 B2 * | 10/2014 | Sirpal ..................... G06F 3/048 |
| | | 345/169 |
| 9,075,785 B2 * | 7/2015 | Park ...................... G06F 16/955 |
| 2006/0206821 A1 * | 9/2006 | Chien ..................... G06F 16/10 |
| | | 715/764 |
| 2007/0143252 A1 * | 6/2007 | Toorn .................. H04L 67/1095 |
| 2011/0010672 A1 | 1/2011 | Hope |
| 2017/0310736 A1 | 10/2017 | Yang et al. |
| 2021/0029193 A1 * | 1/2021 | Li ........................... H04L 67/06 |

(Continued)

FOREIGN PATENT DOCUMENTS

| CN | 101783834 A | 7/2010 |
| CN | 101834937 A | 9/2010 |
| CN | 101202977 B | 5/2012 |

(Continued)

*Primary Examiner* — Bharat Barot
(74) *Attorney, Agent, or Firm* — Conley Rose, P.C.

(57) ABSTRACT

A file sharing method includes that a first mobile terminal establishes a connection to a second mobile terminal. The first mobile terminal displays at least two windows. One of the window includes at least one first file stored in the first mobile terminal, the other window includes a file directory of the second mobile terminal, and the file directory includes at least a first folder. The first mobile terminal sends the first file to the second mobile terminal in response to an operation performed by a user on the first file.

20 Claims, 32 Drawing Sheets

(56) References Cited

U.S. PATENT DOCUMENTS

| | | | | |
|---|---|---|---|---|
| 2022/0342850 | A1* | 10/2022 | Cao | G06F 16/168 |
| 2024/0053879 | A1* | 2/2024 | Wang | G06F 3/04883 |

FOREIGN PATENT DOCUMENTS

| | | | |
|---|---|---|---|
| CN | 102957751 | A | 3/2013 |
| CN | 103490800 | A | 1/2014 |
| CN | 103648180 | A | 3/2014 |
| CN | 103873578 | A | 6/2014 |
| CN | 105227650 | A | 1/2016 |
| CN | 105337641 | A | 2/2016 |
| CN | 106850861 | A | 6/2017 |
| CN | 107066172 | A | 8/2017 |
| JP | H06332817 | A | 12/1994 |
| KR | 20120019198 | A | 3/2012 |

\* cited by examiner

FILE SHARING METHOD OF MOBILE TERMINAL AND DEVICE

CROSS-REFERENCE TO RELATED APPLICATIONS

This is a continuation of International Patent Application No. PCT/CN2020/111773 filed on Aug. 27, 2020, which claims priority to Chinese Patent Application No. 201910817810.9 filed on Aug. 30, 2019. The disclosures of the aforementioned applications are hereby incorporated by reference in their entireties.

TECHNICAL FIELD

This application relates to the field of terminal technologies, and in particular, to a file sharing method of a mobile terminal and a device.

BACKGROUND

With the development of society and technology, intelligent devices such as a personal computer (PC), a notebook computer, a tablet computer, and a smartphone are increasingly widely used. When such intelligent devices are used to exchange information, these devices sometimes need to share files, so as to facilitate viewing or access by users.

In conventional technology, a process of sharing a file between different terminal devices is usually relatively cumbersome. For example, a user needs to share a file on a terminal device A with a terminal device B by performing a plurality of steps. First, a user A enables a BLUETOOTH function in a file sending terminal (or a sending terminal), and a user B enables a BLUETOOTH function in a file receiving terminal (or a receiving terminal). The user A enables a BLUETOOTH search function in the sending terminal. In this case, the sending terminal searches for a nearby terminal with a BLUETOOTH function enabled. When the sending terminal finds the receiving terminal, the sending terminal initiates a BLUETOOTH pairing request to the receiving terminal. When the receiving terminal receives the BLUETOOTH pairing request, the user B agrees to the foregoing BLUETOOTH pairing in the receiving terminal. Finally, the user A selects a file, a sharing manner, and the receiving terminal in the sending terminal, and transmits the selected file to the receiving terminal of the user B. The user B receives the shared file in the receiving terminal.

It can be learned from the foregoing process that current operation steps of sharing a file between different terminal devices are relatively cumbersome and inconvenient.

SUMMARY

This application provides a file sharing method of a mobile terminal and a device, to simplify a file sharing process, improve file sharing efficiency, and further improve user experience.

According to a first aspect, this application provides a file sharing method. The method is applied to a system including a first mobile terminal and a second mobile terminal, and includes following steps.

The first mobile terminal establishes a connection to the second mobile terminal. The first mobile terminal displays at least one local window and at least one another window. The local window includes at least one first file stored in the first mobile terminal, the other window includes a file directory of the second mobile terminal, and the file directory includes at least a first folder. The first mobile terminal sends the first file to the second mobile terminal in response to an operation performed by a user on the first file. The second mobile terminal receives the first file, and stores the first file in the first folder.

In the foregoing method, after the first mobile terminal establishes the connection to the second mobile terminal, the first mobile terminal may display a plurality of windows, and the first mobile terminal may directly send a file to the second mobile terminal through an operation performed by the user on the file in the window. This can simplify a file sharing step and improve user experience.

In a possible embodiment, the first file includes a multimedia file and/or a document, and the first folder includes a second file stored in the second mobile terminal.

In a possible embodiment, the method further includes following steps.

The second mobile terminal sends the second file to the first mobile terminal in response to an operation performed by the user on the second file.

In the foregoing method, the second mobile terminal may share a file of the second mobile terminal with the first mobile terminal in the other window displayed on the first mobile terminal. This can also simplify a file sharing step and improve user experience.

In a possible embodiment, the file directory further includes a second folder.

In this embodiment of this application, the first file may be stored in the second mobile terminal in the following three implementations.

In a first implementation, if a category of the first file is a first category, the second mobile terminal stores the first file in the first folder of the second mobile terminal. Alternatively, if a category of the first file is a second category, the second mobile terminal stores the first file in the second folder of the second mobile terminal.

For example, when the category of the first file is a picture, the first file may be stored in a folder corresponding to the picture, or when the first file is a video, the first file may be stored in a folder corresponding to the video.

In a second implementation, if a file name of the first file includes a first keyword, the second mobile terminal stores the first file in the first folder of the second mobile terminal. Alternatively, if a file name of the first file includes a second keyword, the second mobile terminal stores the first file in the second folder of the second mobile terminal.

In a third implementation, if an extension of the first file is a first extension, the second mobile terminal stores the first file in the first folder of the second mobile terminal. Alternatively, if an extension of the first file is a second extension, the second mobile terminal stores the first file in the second folder of the second mobile terminal.

In a possible embodiment, the operation performed by the user on the first file includes an operation that the user drags the first file to the first folder.

In the foregoing technical solution, the user may directly drag, in the window displayed by the first mobile terminal, the first file in the local window to the folder in the other window, to implement sharing of the first file. In this dragging manner, the user does not need to perform step-by-step operations. This simplifies a file sharing step.

In a possible design, when the file directory of the second mobile terminal included in the other window of the first mobile terminal is a picture, the operation performed by the user on the first file includes a first operation performed by the user on the first file.

In this embodiment of this application, when the file directory in the other window is the picture, the first mobile terminal may perform the first operation such as a touch and hold operation on the first file in the local window, and then store the first file in the second mobile terminal based on content displayed by the first mobile terminal.

In a possible design, the method further includes the following.

The first mobile terminal displays first prompt information. The first prompt information is used to prompt at least one folder included in the picture of the file directory and prompt the user to select a third folder, and the third folder is a folder in the picture of the file directory.

In the foregoing method, prompt information is displayed, so that the user can select a storage location based on a folder included in the other window. In this way, the user can learn of the file storage location. This facilitates searching and improves user experience.

In a possible embodiment, the method further includes the following.

The first mobile terminal displays a fourth folder, and the fourth folder is a folder in the picture of the file directory.

In the foregoing method, the first mobile terminal may further directly display a folder pre-selected by the user on the second mobile terminal or a folder determined by the first mobile terminal based on a type, a name, or the like of a file, and the user does not need to select a storage location from a plurality of pop-up folders. This can improve user experience.

In a possible embodiment, the method further includes the following steps.

The first mobile terminal displays second prompt information. The second prompt information is used to prompt the user that the first file cannot be sent to the second mobile terminal.

In the foregoing method, the first mobile terminal may further display prompt information. The prompt information is used to display prompt information to the user when a specified file cannot be sent to the second mobile terminal. This can achieve an objective of reminding the user.

According to a second aspect, this application provides a file sharing method. The method is applied to a first mobile terminal. The method in the second aspect can perform the method performed by the first mobile terminal in the first aspect or any possible design of the first aspect.

According to a third aspect, this application further provides an electronic device. The electronic device includes a display, one or more processors, a memory, a plurality of folders, and one or more computer programs. The one or more computer programs are stored in the memory, the one or more computer programs include instructions, and when the instructions are invoked and executed by the one or more processors, the electronic device is enabled to perform the method according to the first aspect or any possible design of the first aspect or according to the second aspect or any possible design of the second aspect.

According to a fourth aspect, a computer-readable storage medium is provided. The computer-readable storage medium stores a computer program, and when the computer program is run on an electronic device, the electronic device is enabled to perform the method according to any possible design of the first aspect or the file sharing method according to any possible design of the second aspect.

According to a fifth aspect, a program product is provided. When the program product is run on a computer, the computer is enabled to perform the method according to any possible design of the first aspect or the file sharing method according to any possible design of the second aspect.

DESCRIPTION OF EMBODIMENTS

The following further describes in detail the embodiments of this application with reference to the accompanying drawings. In the descriptions of the embodiments of this application, the following terms "first" and "second" are merely used for description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more than two.

For ease of understanding, concepts related to this application are described as examples for reference, as shown below.

(1) File sharing capability: The file sharing capability may be sharing files on a terminal device A with a terminal device B, so that the terminal device A and the terminal device B can perform an access operation on a same file.

(2) Terminal device: The terminal device is a device having a wireless connection function. In some embodiments of this application, the terminal device may be a portable device, for example, a mobile phone, a tablet computer, or a wearable device (for example, a smartwatch) having a wireless communication function. The portable terminal device has a file sharing capability. An example embodiment of the portable device includes but is not limited to a portable device using iOS®, Android®, Microsoft®, or another operating system. The portable device may alternatively be another portable device provided that the portable device has a file sharing capability.

(3) WI-FI direct: The WI-FI direct or WI-FI Peer-to-Peer (P2P) is a point-to-point connection technology. Terminal devices within a specific range are directly connected through WI-FI, to share and exchange content with each other.

(4) Window: The window is an area used to display a terminal device interface.

(5) Sharing rule: The sharing rule is a rule used to perform authentication and verification on a terminal device at a receive end and a file, so as to ensure that the terminal device at the receive end can receive a file shared by a terminal device at a transmit end.

(6) Folder directory information: The folder directory information is information about a storage path of a file (including a picture, a video, and audio) that is set by a user on a terminal device.

Figure 1:
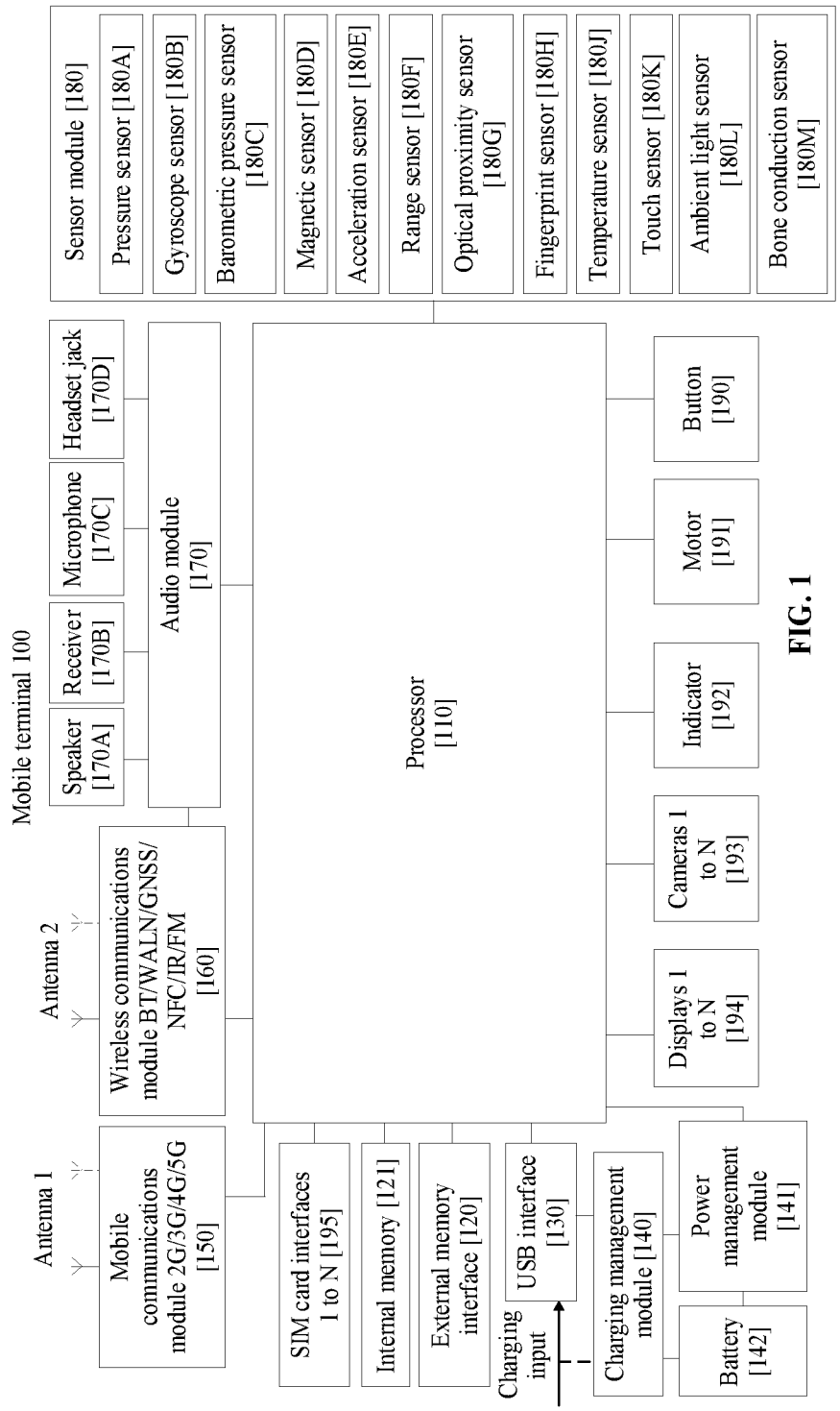
FIG. 1 is a schematic diagram of a hardware structure of a possible mobile terminal according to an embodiment of this application.

An embodiment of this application provides a file sharing method. The method is applicable to a mobile terminal. FIG. 1 is a schematic diagram of a hardware structure of a possible mobile terminal. As shown in FIG. 1, the mobile terminal 100 may include a processor 110, an external memory interface 120, an internal memory 121, a Universal Serial Bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 101 may include an application processor (AP), a modem processor, a graphics processing unit (GPU), an image signal processor (ISP), a controller, a video codec, a digital signal processor (DSP), a baseband processor, and/or a neural network processing unit (NPU). Different processing units may be independent components, or may be integrated into one or more processors.

A memory may be further disposed in the processor 101, and is configured to store instructions and data. In some embodiments, the memory in the processor 101 is a cache. The memory may store instructions or data just used or cyclically used by the processor 101. If the processor 101 needs to use the instructions or the data again, the processor may directly invoke the instructions or the data from the memory. This avoids repeated access and reduces a waiting time of the processor 101, thereby improving system efficiency.

In some embodiments, the processor 110 may be configured to execute the instructions in the memory, and invoke a related module to implement functions of the mobile terminal 100 in this embodiment of this application. For example, when a touch instruction of a user on the display 194 is received, a file multi-window sharing function is implemented between two or more mobile terminals in response to a user operation.

In some embodiments, the processor 110 may include one or more interfaces. The interface may include an Inter-Integrated Circuit (I2C) interface, an I2C Sound (I2S) interface, a pulse code modulation (PCM) interface, a universal asynchronous receiver/transmitter (UART) interface, a Mobile Industry Processor Interface (MIPI), a general-purpose input/output (GPIO) interface, a SIM interface, a USB interface, and/or the like.

The I2C interface is a two-way synchronization serial bus, and includes one serial data line (SDA) and one serial clock line (SCL) In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the mobile terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a BLUETOOTH headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a BLUETOOTH headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a BLUETOOTH module in the wireless communications module 160 through the UART interface, to implement a BLUETOOTH function. In some embodiments, the audio module 170 may transfer an audio signal to the wireless communications module 160 through the UART interface, to implement a function of playing music by using a BLUETOOTH headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the mobile terminal 100. The processor 110 communicates with the display 194 through the DSI interface, to implement a display function of the mobile terminal 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB interface 130 is an interface that conforms to USB standard specifications, and may be a mini USB interface, a micro USB interface, a USB Type-C interface, or the like. The USB interface may be configured to connect to a charger to charge the mobile terminal 100, or may be configured to transmit data between the mobile terminal 100 and a peripheral device, or may be configured to connect to a headset for playing audio through the headset, or may be configured to connect to another mobile terminal such as an augmented reality (AR) device.

It may be understood that the interface connection relationship between modules shown in this embodiment of the present disclosure is merely an example for description, and does not constitute a structural limitation on the mobile terminal 100. In some other embodiments of this application, the mobile terminal 100 may alternatively use an interface connection manner different from that in the foregoing embodiment, or a combination of a plurality of interface connection manners.

The charging management module 140 is configured to receive a charging input from the charger. The charger may be a wireless charger, or may be a wired charger. In some embodiments of wired charging, the charging management module 140 may receive a charging input from a wired charger through the USB interface. In some embodiments of wireless charging, the charging management module 140 may receive a wireless charging input by using a wireless charging coil of the mobile terminal 100. The charging management module 140 may further supply power to the terminal device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the mobile terminal 100 may be implemented by using the antenna module 1, the antenna module 2, the mobile communications module 150, the wireless communications module 160, the modem processor, the baseband processor, and the like.

The antenna 1 and the antenna 2 are configured to transmit and receive electromagnetic wave signals. Each antenna in the mobile terminal 100 may be configured to cover one or more communication frequency bands. Different antennas may be further multiplexed, to improve antenna utilization. For example, a cellular network antenna may be multiplexed as a diversity antenna in a wireless local area network. In some other embodiments, the antenna may be used in combination with a tuning switch.

The mobile communications module 150 may provide a solution, applied to the mobile terminal 100, to wireless communication including second generation (2G), third generation (3G), fourth generation (4G), fifth generation (5G), or the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave through the antenna 1 for radiation. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits an obtained signal to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the mobile terminal 100, to wireless communication including a wireless local area network (WLAN), BLUETOOTH (BT), a global navigation satellite system (GNSS), frequency modulation (FM), a near-field communication (NFC) technology, an infrared (IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the mobile terminal 100, the antenna 1 is coupled to the mobile communications module 150, and the antenna 2 is coupled to the wireless communications module 160, so that the mobile terminal 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-CDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a quasi-zenith satellite system (QZSS), and/or a satellite based augmentation system (SBAS). Further, in this embodiment of this application, the mobile communications module 150 and the wireless communications module 160 may be configured to send a pairing request message to another terminal device, receive a pairing connection consent message fed back by the other terminal device, send a control connection request message to the other terminal device, and the like.

The mobile terminal 100 implements a display function by using the GPU, the display 194, the application processor, and the like. The GPU is a microprocessor for image processing, and is connected to the display 194 and the application processor. The GPU is configured to perform mathematical and geometric calculation for file sharing. The processor 110 may include one or more GPUs that execute program instructions to generate or change display information.

The display 194 may include a display panel. The display panel may be a liquid-crystal display (LCD), an organic light-emitting diode (LED) (OLED), an active-matrix OLED (AMOLED), a flexible LED (FLED), a mini LED, a micro LED, a micro OLED, a quantum dot LED (QLED), or the like. In some embodiments, the mobile terminal 100 may include one or N displays 102, where N is a positive integer greater than 1. Further, in this embodiment of this application, the display 102 may be configured to display a window, and the window is configured to present folder directory information, a file list, a picture, a video, and the like.

The mobile terminal 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a red, green, and blue (RGB) format, a luma, blue projection, and red projection (YUV) format, or the like. In some embodiments, the mobile terminal 100 may include one or N cameras, where N is a positive integer greater than 1.

The digital signal processor is configured to process a digital signal, and may process another digital signal in addition to the digital image signal. For example, when the mobile terminal 100 selects a frequency, the digital signal processor is configured to perform Fourier transform and the like on frequency energy.

The video codec is configured to compress or decompress a digital video. The mobile terminal 100 may support one or more video codecs. Therefore, the mobile terminal 100 may play or record videos in a plurality of encoding formats, for example, Moving Picture Experts Group (MPEG)-1, MPEG-2, MPEG-3, and MPEG-4.

The NPU is a neural network (NN) computing processor, quickly processes input information by referring to a structure of a biological neural network, for example, by referring to a mode of transmission between human brain neurons, and may further continuously perform self-learning. The mobile terminal 100 may implement applications such as intelligent cognition through the NPU, for example, image recognition, facial recognition, speech recognition, and text understanding.

The external memory interface 120 may be configured to connect to an external memory card such as a micro Secure Digital (SD) card, to extend a storage capability of the mobile terminal 100. The external storage card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to implement various function applications and data processing of the mobile terminal 100. The memory 121 may include a program storage area and a data storage area. The program storage area may store an operating system, an application required by at least one function (for example, a sound playing function and an image playing function), and the like. The data storage area may store data (for example, audio data and a phone book) created when the mobile terminal 100 is used, and the like. In addition, the memory 121 may include a high-speed random-access memory (RAM), or may include a nonvolatile memory, for example, at least one magnetic disk storage device, a flash memory, or a Universal Flash Storage (UFS). Further, in this embodiment of this application, the memory 121 may be configured to store a file including a video file, an audio file, a picture, and the like.

The mobile terminal 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, or a horn, is configured to convert an audio electrical signal into a sound signal. The mobile terminal 100 may listen to music or answer a hands-free call through the speaker 170A.

The receiver 170B, or an earpiece, is configured to convert an audio electrical signal into a sound signal. When the mobile terminal 100 answers a call or listens to a voice message, the receiver 170B may be placed near a human ear to listen to a voice.

The microphone 170C, or a mike, is configured to convert a sound signal into an electrical signal. When making a call or sending a voice message, the user may make a sound near the microphone 170C through the mouth, to enter a sound signal to the microphone 170C. At least one microphone 170C may be disposed in the mobile terminal 100. In some other embodiments, two microphones may be disposed in the mobile terminal 100, to implement a noise reduction function in addition to a function of collecting a sound signal. In some other embodiments, three, four, or more microphones may be alternatively disposed in the mobile terminal 100, to collect a sound signal, implement noise reduction, and identify a sound source, so as to implement a directional recording function and the like.

The headset jack 170D is configured to connect to a wired headset. The headset jack may be the USB interface, or may be a 3.5 millimeters (mm) Open Mobile Terminal Platform (OMTP) standard interface or a cellular telecommunications industry association of the United States of America (USA) (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The mobile terminal 100 determines pressure strength based on a change of the capacitance. When a touch operation is performed on the display 194, the mobile terminal 100 detects intensity of the touch operation based on the pressure sensor 180A. The mobile terminal 100 may also calculate a touch location based on a detection signal of the pressure sensor 180A. In some embodiments, touch operations performed on a same touch location but having different touch operation intensity may correspond to different operation instructions. For example, when a touch operation whose touch operation intensity is less than a first pressure threshold is performed on an icon of Messages, an instruction for viewing a Short Message Service (SMS) message is executed. When a touch operation whose touch operation intensity is greater than or equal to the first pressure threshold is performed on the icon of messages, an instruction for creating a new SMS message is executed.

The gyroscope sensor 180B may be configured to determine a motion posture of the mobile terminal 100. In some embodiments, an angular velocity of the mobile terminal 100 around three axes (namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the mobile terminal 100 shakes, and calculates, based on the angle, a distance for which a lens module needs to compensate, so that the lens cancels the shake of the mobile terminal 100 through reverse motion, thereby implementing the image stabilization. The gyroscope sensor 180B may be further used in a navigation scenario and a motion-controlled gaming scenario.

The barometric pressure sensor 180C is configured to measure barometric pressure. In some embodiments, the mobile terminal 100 calculates an altitude by using a barometric pressure value measured by the barometric pressure sensor 180C, to assist in positioning and navigation.

The magnetic sensor 180D includes a Hall effect sensor. The mobile terminal 100 may detect opening and closing of a flip cover by using the magnetic sensor 180D. In some embodiments, when the mobile terminal 100 is a clamshell phone, the mobile terminal 100 may detect opening and closing of a clamshell by using the magnetic sensor 180D. Further, a feature such as automatic unlocking upon opening of the flip cover is set based on a detected opening or closing state of the flip cover or a detected opening or closing state of the clamshell.

The acceleration sensor 180E may detect a magnitude of an acceleration of the mobile terminal 100 in each direction (usually, on three axes). When the mobile terminal 100 is still, a magnitude and a direction of gravity may be detected. The acceleration sensor may be further configured to identify a posture of the terminal device, and is used in an application such as switching between a landscape mode and a portrait mode or a pedometer.

The range sensor 180F is configured to measure a distance. The mobile terminal 100 may measure a distance in an infrared or a laser manner. In some embodiments, in a photographing scenario, the mobile terminal 100 may measure a distance by using the range sensor 180F, to implement quick focusing.

The optical proximity sensor 180G may include, for example, an LED and an optical detector such as a photodiode. The LED may be an infrared LED. The mobile terminal 100 emits infrared light by using the LED. The mobile terminal 100 detects, by using the photodiode, infrared reflected light that comes from a nearby object. When detecting sufficient reflected light, the mobile terminal 100 may determine that there is an object near the mobile terminal. When detecting insufficient reflected light, the mobile terminal 100 may determine that there is no object near the mobile terminal 100. The mobile terminal 100 may detect, by using the optical proximity sensor 180G, that the user holds the mobile terminal 100 close to an ear for a call, to automatically perform screen-off to save power. The optical proximity sensor 180G may also be used in a smart cover mode or a pocket mode to automatically perform screen unlocking or locking.

The ambient light sensor 180L is configured to sense ambient light brightness. The mobile terminal 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the mobile terminal 100 is in a pocket, to prevent an accidental touch.

The fingerprint sensor 180H is configured to collect a fingerprint. The mobile terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the mobile terminal 100 executes a temperature processing policy based on the temperature detected by the temperature sensor 180J. For example, when the temperature reported by the temperature sensor 180J exceeds a threshold, the mobile terminal 100 degrades performance of a processor near the temperature sensor 180J, to reduce power consumption and implement thermal protection. In some other embodiments, when the temperature is less than another threshold, the mobile terminal 100 heats up the battery 142, to avoid abnormal shutdown of the mobile terminal 100 due to a low temperature. In some other embodiments, when the temperature is less than still another threshold, the mobile terminal 100 boosts an output voltage of the battery 142, to avoid abnormal shutdown due to a low temperature.

The touch sensor 180K is a touch panel. The touch sensor may be disposed on the display 194. The touch sensor is configured to detect a touch operation performed on or near the touch sensor. The touch sensor may transfer the detected touch operation to the application processor, to determine a type of a touch event. A corresponding visual output may be provided through the display 194. In some other embodiments, the touch sensor 180K may alternatively be disposed on a surface of the mobile terminal 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may also be disposed in the headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button may be a mechanical button, or may be a touch button. The mobile terminal 100 may receive a key input, and generate a key signal input related to user settings and function control of the mobile terminal 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM. The SIM card may be inserted into the SIM card interface or removed from the SIM card interface, to implement contact with or separation from the mobile terminal 100. The mobile terminal 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface. The plurality of cards may be of a same type or of different types. The SIM card interface 195 is also compatible with different types of SIM cards. The SIM card interface 195 is also compatible with an external storage card. The mobile terminal 100 interacts with a network by using the SIM card, to implement functions such as calling and data communication. In some embodiments, the mobile terminal 100 uses an eSIM, namely, an embedded SIM card. The eSIM card may be embedded in the mobile terminal 100, and cannot be separated from the mobile terminal 100.

It may be understood that the structure shown in this embodiment of the present disclosure constitutes no specific limitation on the mobile terminal 100. In some other embodiments of this application, the mobile terminal 100 may include more or fewer components than those shown in the figure, or combine some components, or split some components, or have different component arrangements. The components shown in the figure may be implemented by hardware, software, or a combination of software and hardware.

Figure 2:
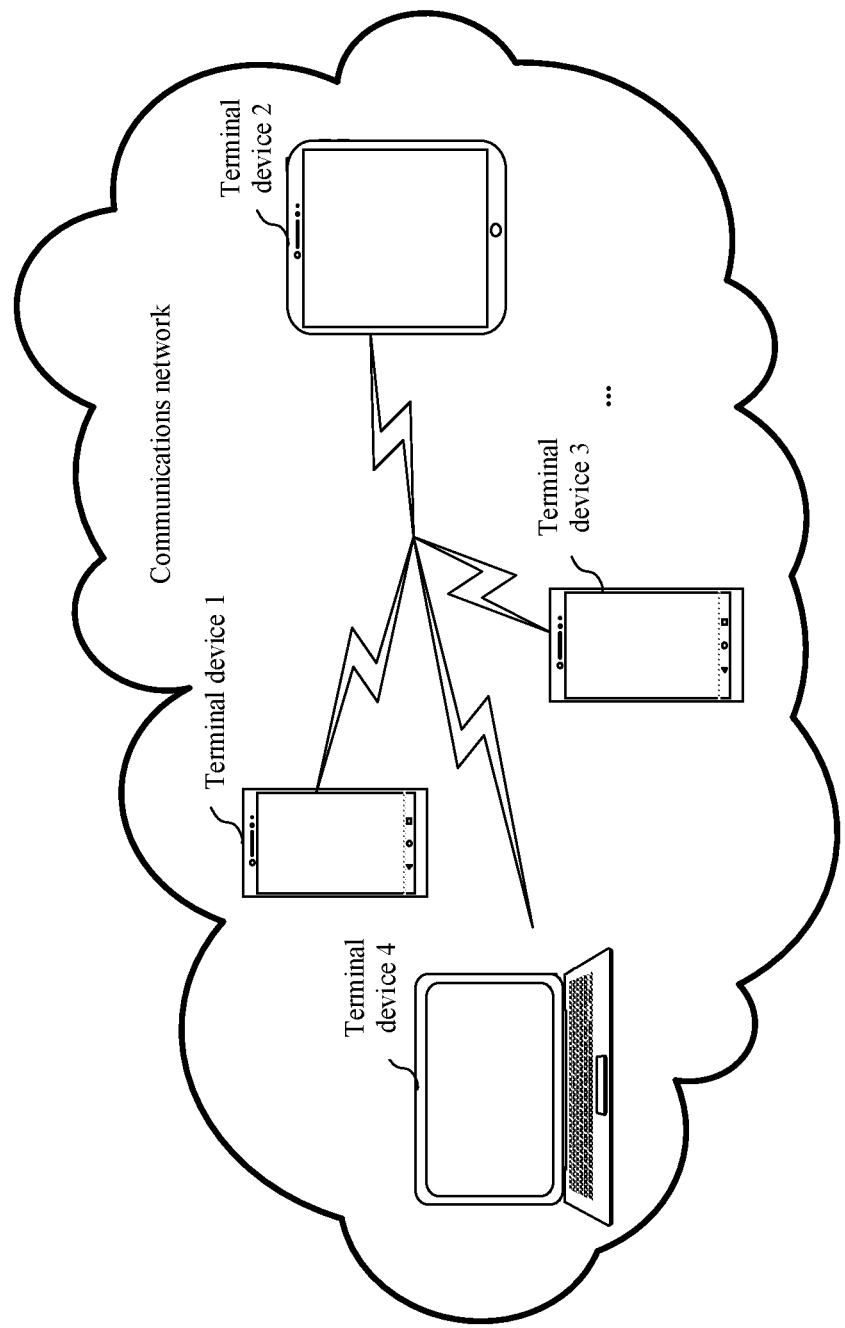
FIG. 2 is a schematic diagram of a possible scenario according to an embodiment of this application.

The file sharing method provided in this embodiment of this application may be applied to a scenario in which a plurality of terminal devices are connected to each other based on a communications network. As shown in FIG. 2, a plurality of terminal devices such as a terminal device 1, a terminal device 2, a terminal device 3, and a terminal device 4 are included. Each terminal device may send a file to another terminal device. The communications network may be a local area network, or may be a wide area network for transferring through a relay device. For example, when the communications network is a local area network, the communications network may be a short-range communications network such as a WI-FI hotspot network, a WI-FI P2P network, a BLUETOOTH network, a ZIGBEE network, or an NFC network. For example, when the communications network is a wide area network, the communications network may be a third generation mobile communication technology (3G) network, a fourth generation mobile communication technology (4G) network, a fifth generation mobile communication technology (5G) network, a future evolved public land mobile network (PLMN), or the internet.

For ease of description below, a mobile terminal device at a receive end is denoted as a "receive end device", and a mobile terminal device at a transmit end is denoted as a "transmit end device".

In the scenario shown in FIG. 2, different terminal devices may share a file through the communications network, for example, may exchange a picture, a text, or a video, or may exchange a result obtained after a terminal device processes an object such as a picture, a text, or a video. In an example, assuming that the terminal device 1 is a transmit end device, and the terminal device 2, the terminal device 3, and the terminal device 4 serve as receive end devices, the terminal device 1 may send a file to at least one of the terminal device 2, the terminal device 3, and the terminal device 4. It should be noted that, in the scenario shown in FIG. 2, the terminal device 2, the terminal device 3, or the terminal device 4 may alternatively serve as a transmit end device, and the terminal device 1 may alternatively serve as a receive end device. In other words, each terminal device may serve as a transmit end device or a receive end device.

In the network scenario shown in FIG. 2, a communication connection may be established between the terminal devices. For example, when the terminal device is a mobile phone, a plurality of mobile phones may establish a connection by using a short-range communications technology such as BLUETOOTH or WI-FI. After the plurality of mobile phones establish the connection, the plurality of mobile phones may share a file. For example, the plurality of mobile phones may establish the connection through BLUETOOTH pairing. When pairing succeeds, in other words, when the plurality of mobile phones successfully establishes the connection, a plurality of windows may be opened on a transmit end device such as a mobile phone 1. Some windows display an interface of the mobile phone 1, and the other windows display an interface of a receive end device, for example, an interface of a mobile phone 2 or a mobile phone 3. A user may share a file of the mobile phone 1 with the mobile phone 2 or the mobile phone 3. This can implement file sharing between a plurality of terminal devices.

The plurality of windows opened on the transmit end device include a local window and another window. The local window is a window used to display a file stored on the transmit end device, and the other window is a window used to display a file stored on the receive end device. It may be understood that the local window and the other window are located in different areas on a display of the transmit end device.

In this embodiment of this application, each terminal device may store a sharing rule, to check whether the receive end device can receive a file shared by the transmit end device. It may be understood that, after a plurality of terminal devices establish a connection, the transmit end device may perform authentication and verification on the receive end device by using a sharing rule stored by the transmit end device, in other words, the transmit end device may verify whether the receive end device can receive a file shared by the transmit end device. In addition, the receive end device may also verify whether the receive end device agrees to receive a file shared by the transmit end device.

Further, the receive end device may display an interface of the receive end device or folder directory information on the transmit end device through projection. It should be noted that the folder directory information may be understood as information about a file storage path that is set by the user on the receive end device. In addition, the folder directory information may be directory information of an existing folder on the receive end device, or may be directory information of a folder newly created by the user on the receive end device.

For ease of description, in this application, the folder newly created by the user on the receive end device is denoted as a "shared folder" below.

In this embodiment of this application, the receive end device may respond to a first operation of the user. The first operation may be an operation that the user selects at least one existing folder on the receive end device, or an operation that the user newly creates a shared folder on the receive end device. In other words, the user may select at least one existing folder on the receive end device to store a to-be-received shared file, or the user may newly create a shared folder on the file sharing receive end device, and the user may define a storage path of the shared folder. In this way, in a file transmission process, a received file may be stored in a path specified by the user. This can improve user experience.

It should be noted that the user may pre-store some files in an existing folder or a newly created shared folder on the receive end device, and the pre-stored files may also be shared with another terminal device. Certainly, it may be understood that a file may be stored locally in a terminal device, or may be stored in a server. This is not limited in this application.

In some embodiments of this application, the newly created shared folder may be classified into a picture folder, a video folder, an audio folder, and the like. In addition, a same file type may be further classified. For example, a picture category is further classified into a landscape category, a person category, and an animal category. In this way, in the newly created shared folder, a folder obtained after further classification may also be considered as a newly created folder.

Optionally, after the user selects a folder or newly creates a shared folder on the receive end device, the user may select a storage path of a file on the receive end device, for example, may store the file in a sub-folder in the newly created shared folder, or may store the file in a path that is easy to find based on user habits. It should be noted that, when there are a plurality of receive end devices, the user may set different storage paths on different receive end devices, in other words, storage paths of a same file or a same type of files are different on different receive end devices.

Further, a user-defined file storage path may be stored in a data format such as a text format, an Extensible Markup Language (XML) format, or a JavaScript Object Notation (JSON) format. In addition, the storage path may be stored locally, or may be stored in a cloud. This is not limited in this application.

Figure 3:
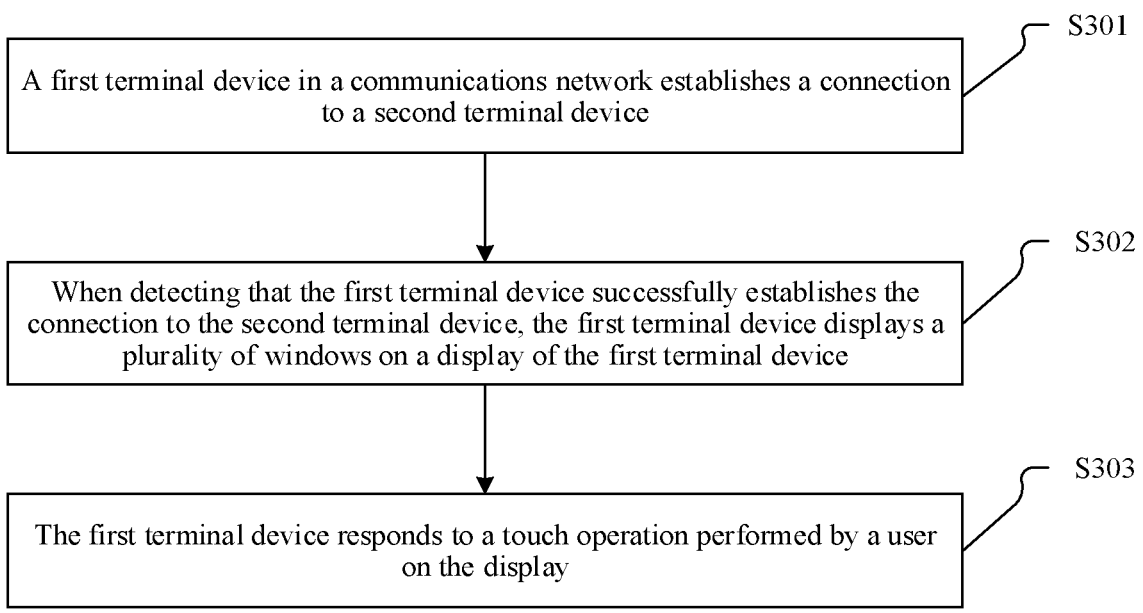
FIG. 3 is a flowchart of a file sharing method according to an embodiment of this application.
Figure 4A:
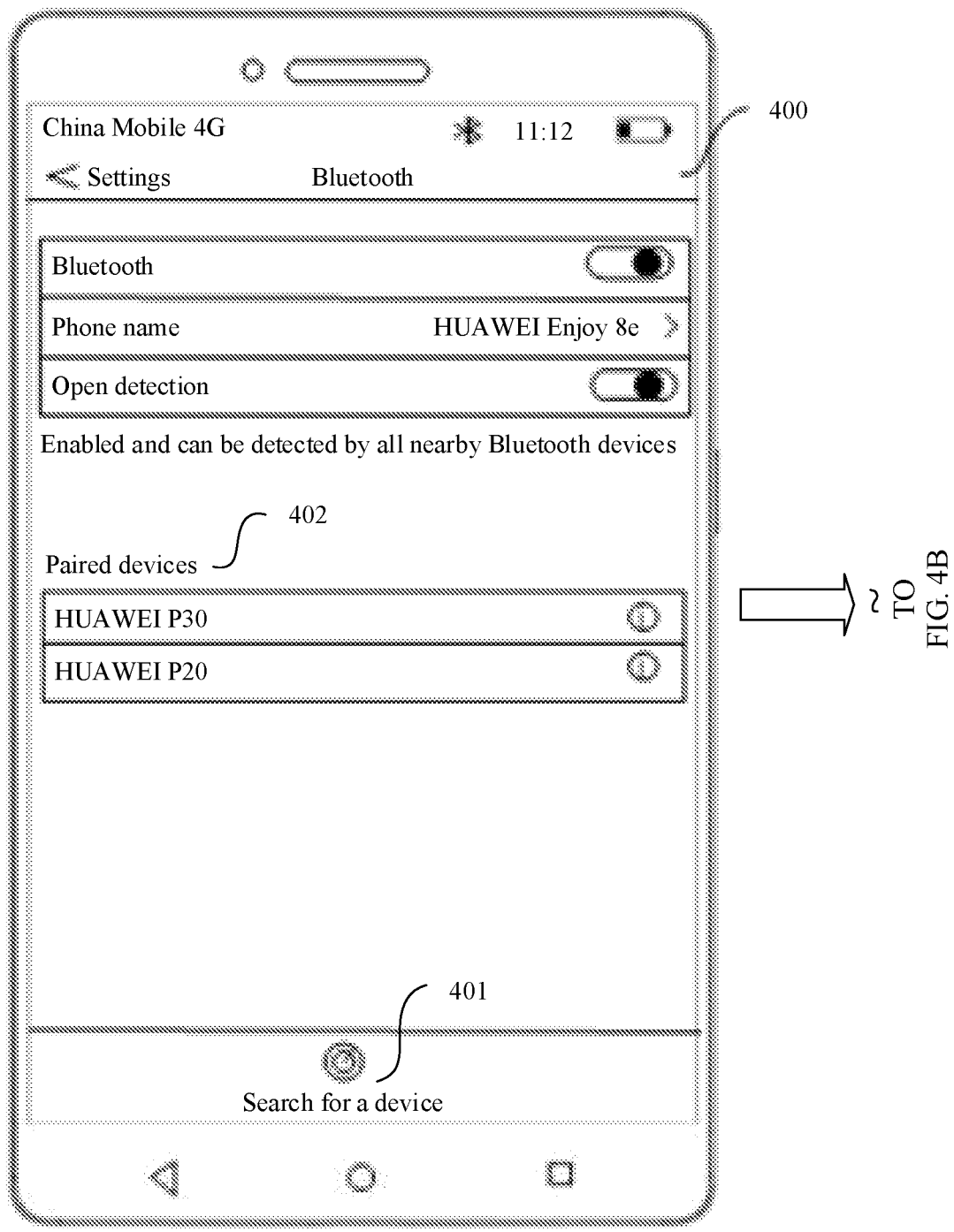
FIG. 4A, FIG. 4B, FIG. 4C, and FIG. 4D are a group of schematic diagrams of a graphical user interface displayed when mobile terminals are connected according to an embodiment of this application.
Figure 4B:
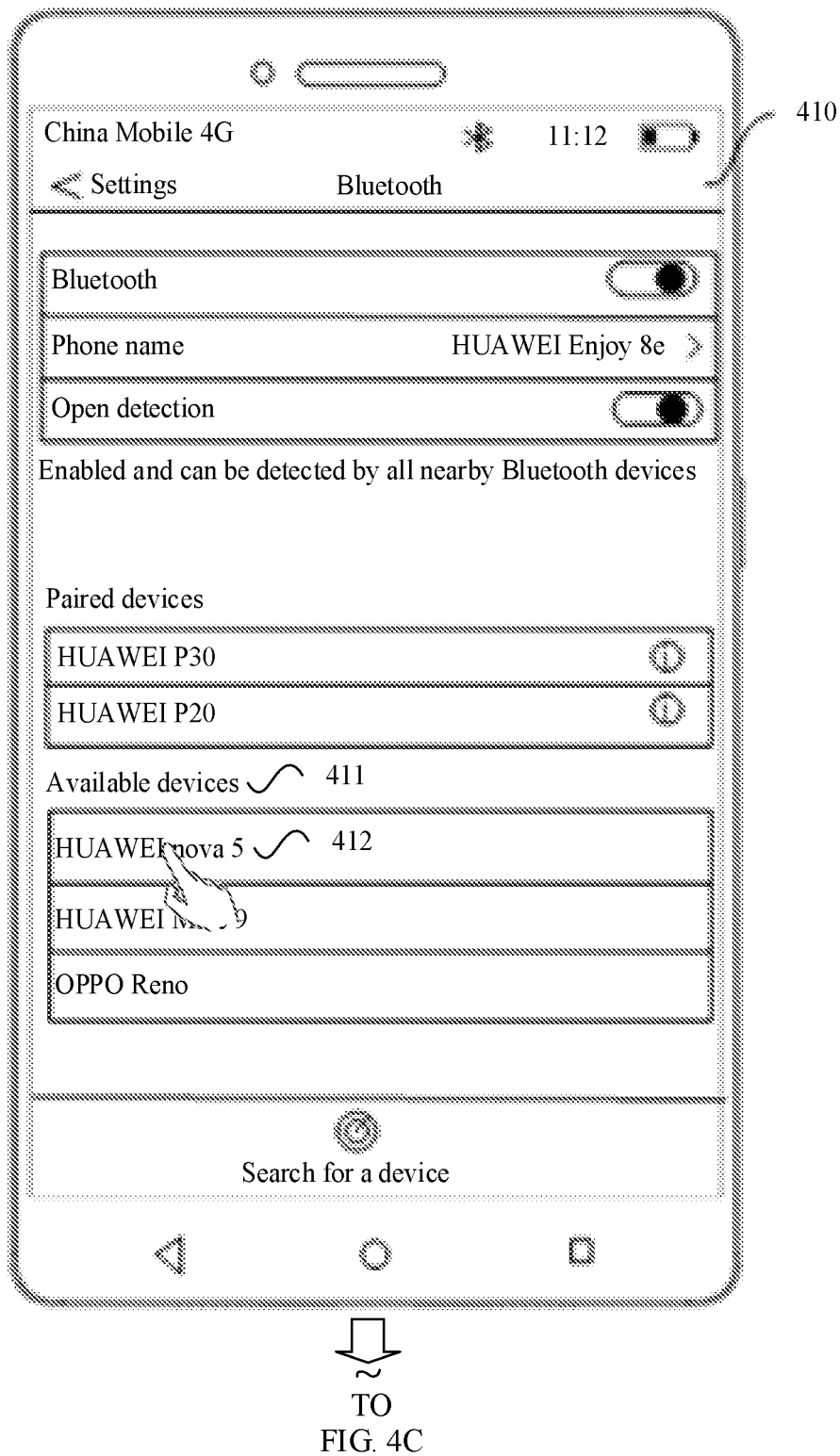
Figure 4C:
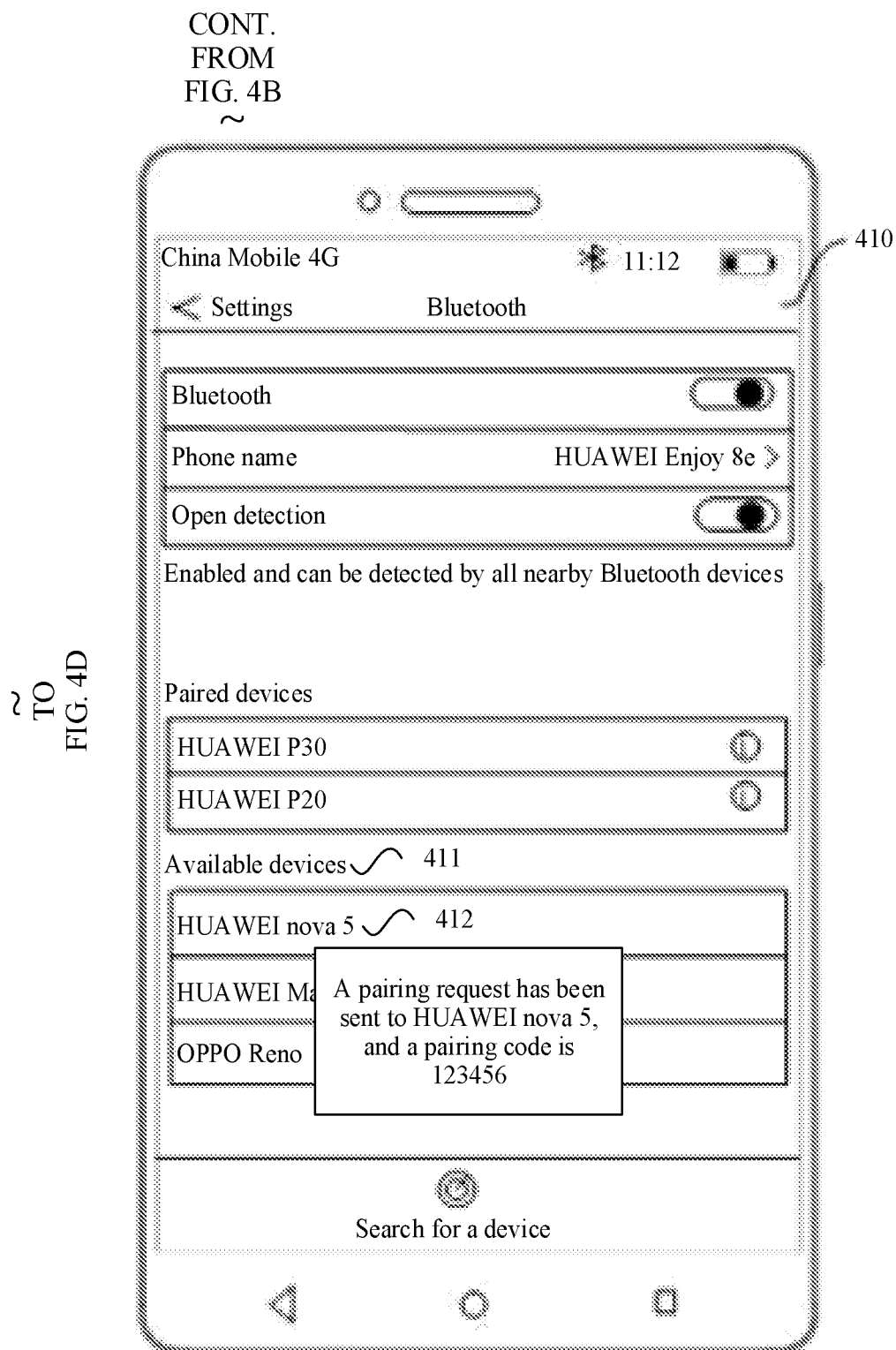
Figure 4D:
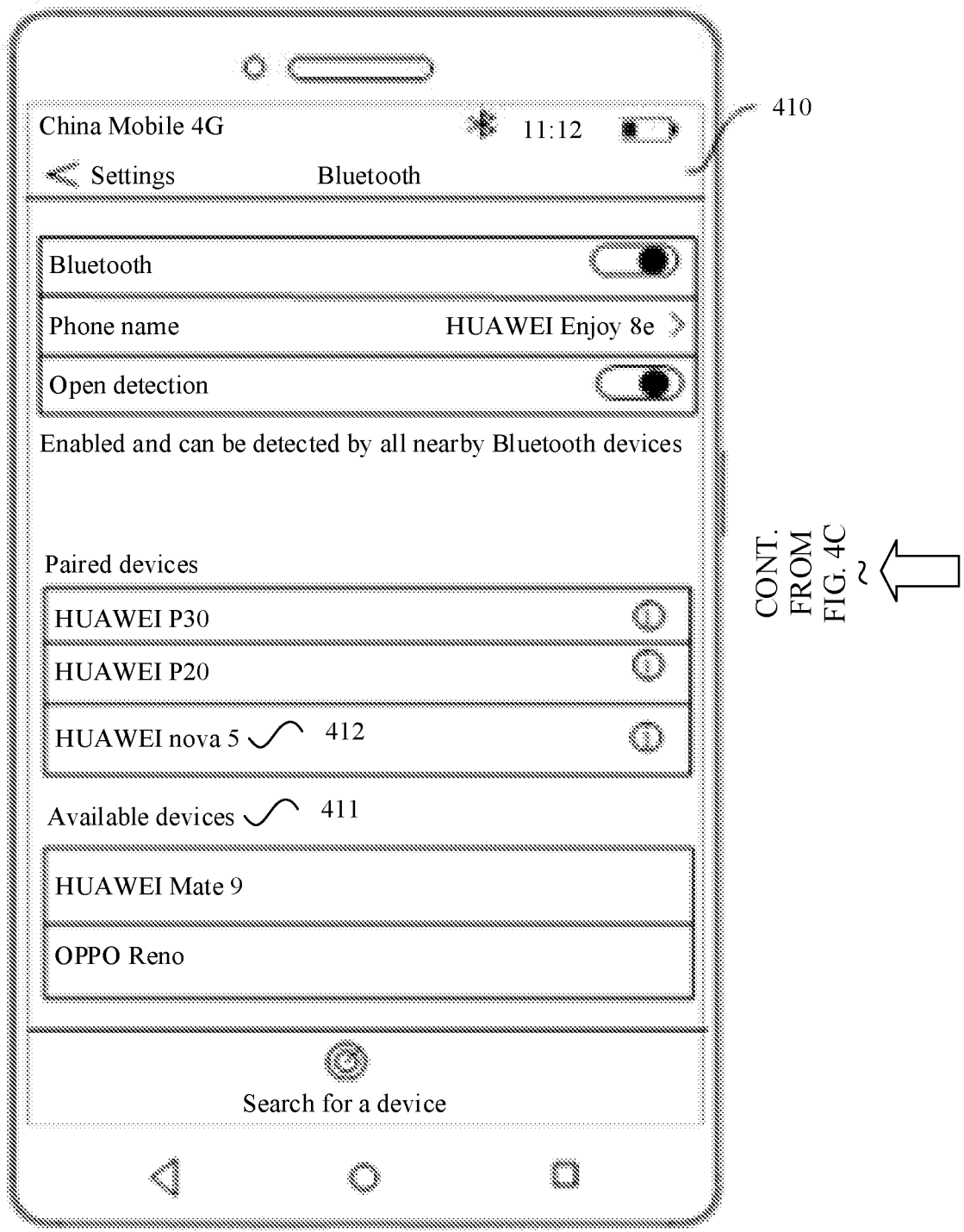

An embodiment of this application provides a file sharing method. The method is applicable to the network scenario shown in FIG. 2. A structure of each terminal device in this embodiment of this application may be the structure of the mobile terminal 100 shown in FIG. 1, or may be another structure. This is not limited in this application. As shown in FIG. 3, the method includes the following steps.

For ease of description below, a terminal device at a file transmit end is denoted as a "first terminal device", and a terminal device at a file receive end is denoted as a "second terminal device".

S301: A first terminal device in a communications network establishes a connection to a second terminal device. If successfully establishing the connection to the second terminal device, the first terminal device may continue to perform S302.

The first terminal device is any terminal device in the communications network, and the second terminal device is at least one terminal device other than the first terminal device in the communications network.

In some embodiments, the first terminal device may send a connection request message to the second terminal device, to connect to the second terminal device. It should be noted that, when the first terminal device establishes the connection to the second terminal device, the first terminal device may actively initiate a connection request, and the second terminal device receives the connection request, or the second terminal device may actively initiate a connection request, and the first terminal device receives the connection request.

In some embodiments, when a structure of the first terminal device is the mobile terminal 100 shown in FIG. 1, an example in which the first terminal device sends a connection request message to the second terminal device is used. After the processor in the first terminal device generates the connection request message, the connection request message may be sent to the second terminal device by using the mobile communications module 105 or the wireless communications module 106.

In this embodiment of this application, the first terminal device may establish the connection to the second terminal device in a short-range connection manner, for example, through BLUETOOTH, a WI-FI hotspot, WI-FI direct, or NFC.

In an example, an example in which a shared file is a picture and terminal devices are connected through BLUETOOTH is used for description. It may be understood that a user A may be an owner of the first terminal device, and a user B may be an owner of the second terminal device.

As shown in FIG. 4A to FIG. 4D, the first terminal device displays a user interface 400 on a display in response to a first operation of the user A. The first operation may be an operation performed by the user A on a BLUETOOTH icon, or may be a voice instruction (for example, "enable BLUETOOTH") operation of the user A, or may be a shortcut gesture operation (for example, three-finger slide up). For example, if a touch operation is performed on the BLUETOOTH icon, the first terminal device may respond to, in the following manner, the operation performed on the BLUETOOTH icon. After detecting the operation performed on the BLUETOOTH icon, the touch sensor 180K of the first terminal device sends a touch event to the processor (for example, the application processor). After receiving the touch event, the processor determines that a type of the touch event is an operation of enabling BLUETOOTH, and then indicates the display to display the user interface 400. The user interface 400 includes a "Search for a device" control 401 and "Paired devices" 402. After the user A taps the "Search for a device" control 401, a user interface 410 may be displayed on the display of the first terminal device. The user interface includes terminal identifiers of "Available devices" 411, for example, an identifier 412 (HUAWEI nova 5). It may be understood that "Available devices" 411 may include a plurality of terminal devices.

When the user A taps an identifier (for example, HUAWEI nova 5) of any terminal device in "Available devices", a prompt box "A pairing request has been sent to HUAWEI nova 5, and a pairing code is 123456" may be popped up on the display of the first terminal device. In this way, the terminal device identified as HUAWEI nova 5 may receive the pairing request. Assuming that a terminal identifier used by the user B is HUAWEI nova 5, the user B may agree to the pairing request. After the user B taps a pairing request consent control on a display of the terminal device identified as HUAWEI nova 5, the identifier HUAWEI nova 5 is added to "Paired devices" 402 on the display of the first terminal device. In this way, a connection between terminal devices has been established.

Certainly, it may be understood that the terminal device identified as HUAWEI nova 5 may be the second terminal device.

Optionally, in this embodiment of this application, after the first terminal device sends the connection request message to the second terminal device, if the first terminal device does not receive, within specified duration, a connection success message fed back by the second terminal device, the first terminal device may send the connection request message to the second terminal device again, until the first terminal device successfully establishes the connection to the second terminal device.

S302: When detecting that the first terminal device successfully establishes the connection to the second terminal device, the first terminal device displays a plurality of windows on the display of the first terminal device.

S303: The first terminal device responds to a touch operation performed by the user on the display. When the plurality of windows is displayed on the interface of the first terminal device, the user may perform a touch operation on a file or a folder in the plurality of windows, to store the file of the first terminal device in the second terminal device. This implements file sharing.

The user may drag a file in the plurality of windows displayed by the first terminal device. In other words, it may be understood that the first terminal device may receive a touch instruction executed by the user on the display of the first terminal device, or a gesture operation instruction executed by the user on the display of the first terminal device. In this case, the first terminal device may respond to a gesture operation performed by the user on the display. The gesture operation performed by the user on the display includes a drag operation, a tap operation, a slide operation, a swipe operation, or the like.

Steps S302 and S303 in this embodiment of this application are described in detail below with reference to a specific scenario.

First scenario: After the first terminal device establishes the connection to the second terminal device, the first terminal device may receive picture information of a file directory sent by the second terminal device. The picture information of the file directory may carry identification information of the second terminal device.

It can be learned from the foregoing descriptions of the network scenario to which this embodiment of this application is applied that the terminal device at the file transmit end, that is, the first terminal device, may store a sharing rule. When the second terminal device sends the picture information of the file directory to the first terminal device, and the first terminal device receives the picture information of the file directory, the first terminal device may verify whether the first terminal device has permission to send a file to the second terminal device.

In this embodiment of this application, the first terminal device may perform verification on the second terminal device according to the sharing rule. Further, the sharing rule may include a first permission table and/or a second permission table. The first permission table may record a correspondence between identification information of the first terminal device and the identification information of the second terminal device. For details, refer to Table 1. The second permission table may record a correspondence between the identification information of the first terminal device, the identification information of the second terminal device, and identification information of a file that can be received. For details, refer to Table 2. Identification information of a terminal device may be a model of the terminal device, and file identification information may be a file type or a file name. This is not limited in this application.

TABLE 1

| First terminal device | Second terminal device |
|---|---|
| A1 | B1 |
|  | B2 |
| A2 | B1 |
|  | B3 |

When the first permission table is stored in the first terminal device, as shown in Table 1, a terminal device to which the first terminal device may send a file may be reflected. In other words, Table 1 may be understood as that the terminal device A1 may send a file to the terminal devices B1 and B2, and the terminal device A2 may send a file to the terminal devices B1 and B3.

Certainly, it may be understood that, when the first permission table is stored in the second terminal device, Table 1 is used as an example for description. In this embodiment of this application, it may be understood that the second terminal device has permission to receive a file sent by the first terminal device. In other words, the terminal devices B1 and B2 have permission to receive a file sent by A1, and the terminal devices B1 and B3 may receive a file sent by A2. During actual application, it is assumed that the first terminal device is A1, the second terminal devices are B1 and B2, A1 has permission to send a file to the devices B1 and B2, but only B1 may have permission to receive a file sent by A1. Therefore, in this embodiment of this application, "the first terminal device may send a file to the second terminal device" and "the second terminal device may receive a file sent by the first terminal device" are not equivalent.

TABLE 2

| First terminal device | Second terminal device | File identifier |
|---|---|---|
| A1 | B1 | T1 and T2 |
|  | B2 | T3 and M1 |
| A2 | B1 | T1 and M3 |
|  | B3 | M2 and T3 |

In Table 2, the terminal device A1 may send the files T1 and T2 to the terminal device B1, the terminal device A1 may send the files T3 and M1 to the terminal device B2, the terminal device A2 may send the files T1 and M3 to the terminal device B1, and the terminal device A2 may send the files M2 and T3 to the terminal device B3.

It should be noted that Table 1 and Table 2 are merely examples, and this application is not limited to the content listed in the foregoing tables.

In some embodiments, when the first terminal device stores the first permission table, it is assumed that the identification information of the first terminal device (the transmit end device) is A1, and the identification information of the second terminal device (the receive end device) is B1, B2, and B3. After the first terminal device establishes connections to a plurality of second terminal devices, the terminal device A1 may verify whether a connected terminal device is included in identification information of a terminal device to which a file can be sent. If the terminal device connected to the terminal device A1 is included in the identification information of the device to which a file can be sent, it is determined that the transmit end device can send a file to the connected terminal device, or if the connected terminal device is not included in the identification information of the device to which a file can be sent, it is determined that the transmit end device cannot send a file to the connected terminal device. In an example, when the terminal device A1 has established connections to the terminal devices B1, B2, and B3, but identification information of devices to which a file can be sent in the first permission table includes the terminal devices B1 and B2, it indicates that the terminal device A1 has no permission to send a file to the terminal device B3.

In some other embodiments, when the first terminal device stores the second permission table, for example, for Table 2, the first terminal device may verify whether the first terminal device has permission to send a file of a specific type or name to the second terminal device. Assuming that the terminal device A1 is to share a file whose file identifier is T1, it can be learned from Table 2 that the terminal device A1 has permission to send the file whose identifier is T1 to the terminal device B1, and the terminal device A1 has no permission to send the file whose identifier is T1 to the terminal device B2.

The second permission table may also be understood as that the user may set file sharing permission in the first terminal device. For example, the first terminal device A1 includes the files T1, T2, M1, and M2. In this case, the user may set the permission that the files whose file identifiers are T1, T2, and M1 can be shared with another terminal device, and the file whose file identifier is M2 cannot be shared with the other terminal device.

It should be noted that the first permission table and the second permission table may be preset by the user on the terminal device at the transmit end. For example, assuming that the identification information of the first terminal device is A1, the user may set, in the first terminal device A1, that the terminal device whose identification information is A1 can send a file to the second terminal devices whose identification information is B1 and B2. For another example, the user may set, in the first terminal device A1, that the terminal device whose identification information is A1 can send the files T1 and T2 to the second terminal device whose identification information is B1, and can send the files T3 and M1 to the second terminal device whose identification information is B2.

Further, in this embodiment of this application, after the first terminal device establishes the connection to the second terminal device, the second terminal device may send folder directory configuration information to the first terminal device. It may be understood that the folder directory configuration information may be a folder directory and a file storage path defined by the user in the second terminal device.

A folder for storing a file may be a folder newly created by the user, or may be an existing folder selected on the terminal device. Therefore, the file sharing method provided in this embodiment of this application is described for the two different cases.

First case: When the directory configuration information is directory information corresponding to a folder selected by the user from existing folders of the second terminal device, an example in which there are one local window and one another window is used below to describe the file sharing method provided in this embodiment of this application. For example, if a file in the local window is a picture, the picture may be a picture obtained by the terminal device through photographing, or may be a picture stored in the terminal device, or may be a picture received by the terminal device from another device.

In this embodiment of this application, the second terminal device may send file directory information to the first terminal device in a snapshot manner, and the second terminal device may send the directory configuration information and file information that is stored in a memory of the second terminal device to the first terminal device. It should be understood that the file information stored in the memory of the second terminal device may include file storage path information, file size information, and the like.

Figure 5A:
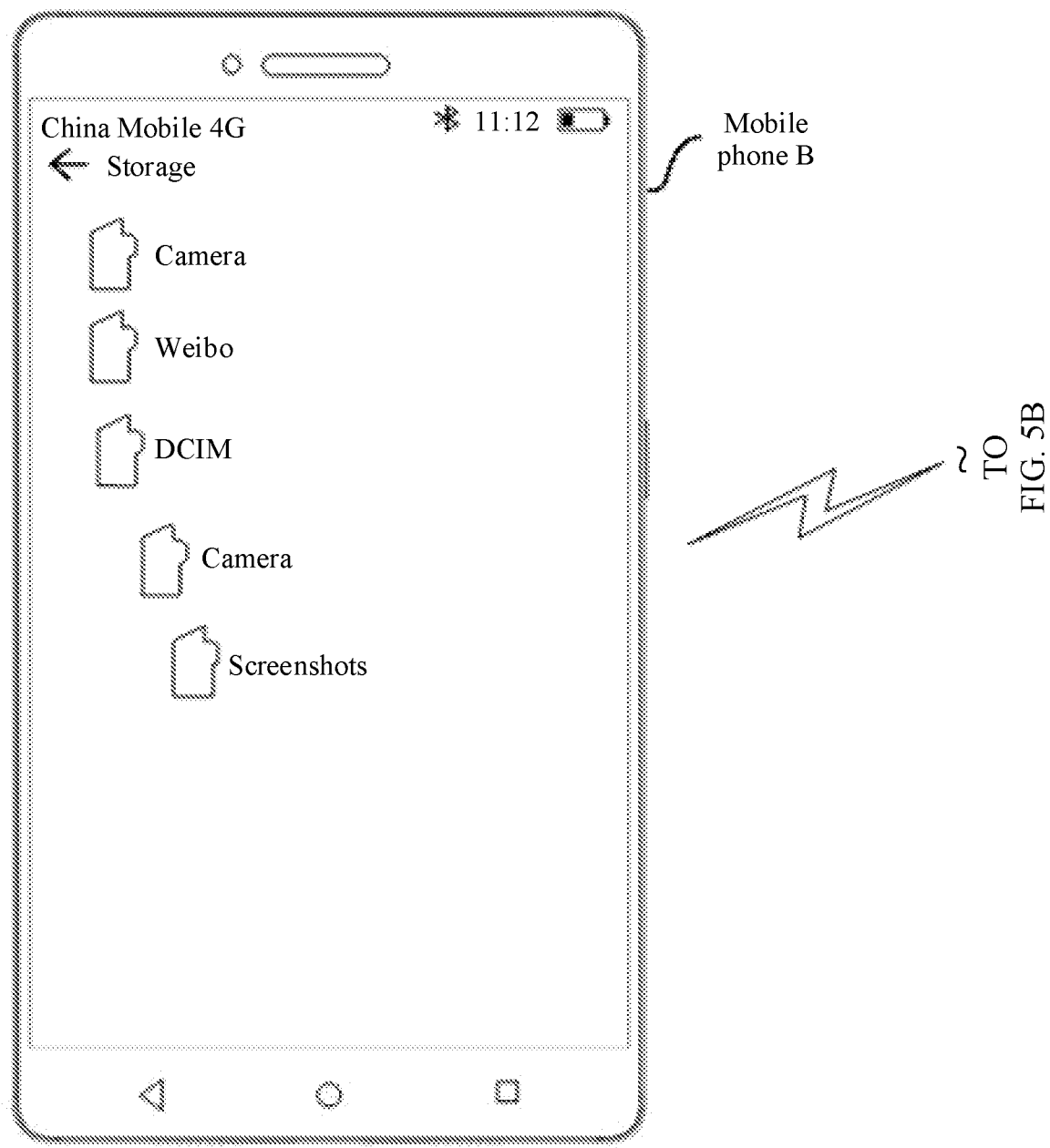
FIG. 5A and FIG. 5B are a group of schematic diagrams of a graphical user interface according to an embodiment of this application.
Figure 5B:
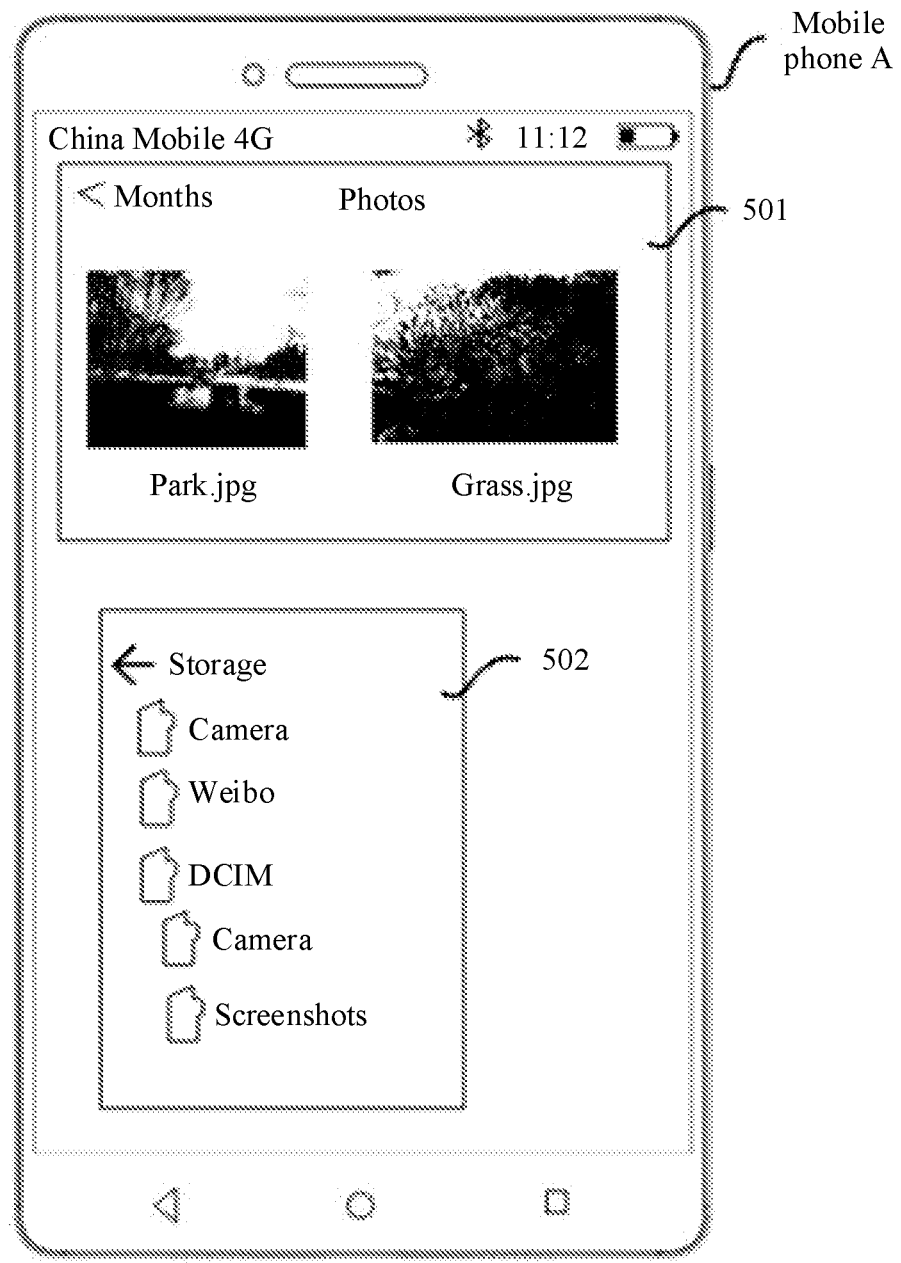

As shown in FIG. 5A and FIG. 5B, a mobile phone is used as an example. It is assumed that a storage path of a picture selected by the user on a mobile phone B (the second terminal device) is: Storage/digital camera images (DCIM)/Camera, and file directory information of the mobile phone B includes a folder icon and a folder identifier in the mobile phone B shown in FIG. 5A and FIG. 5B. After a mobile phone A establishes a connection to the mobile phone B, the mobile phone B may send the file directory information to the mobile phone A in a snapshot manner. After the mobile phone A receives the file directory information, two windows are displayed on a display of the mobile phone A. One window 501 displays a local file of the first terminal device, for example, two pictures respectively named "Park" and "Grass". The window 501 is a local window. The other window 502 displays a folder directory of the second terminal device. The window 502 is another window. Assuming that a picture to be shared by the mobile phone A is the picture named "Park", the mobile phone A may store the to-be-shared picture in a corresponding path based on the storage path of the file selected by the user on the mobile phone B.

Figure 6A:
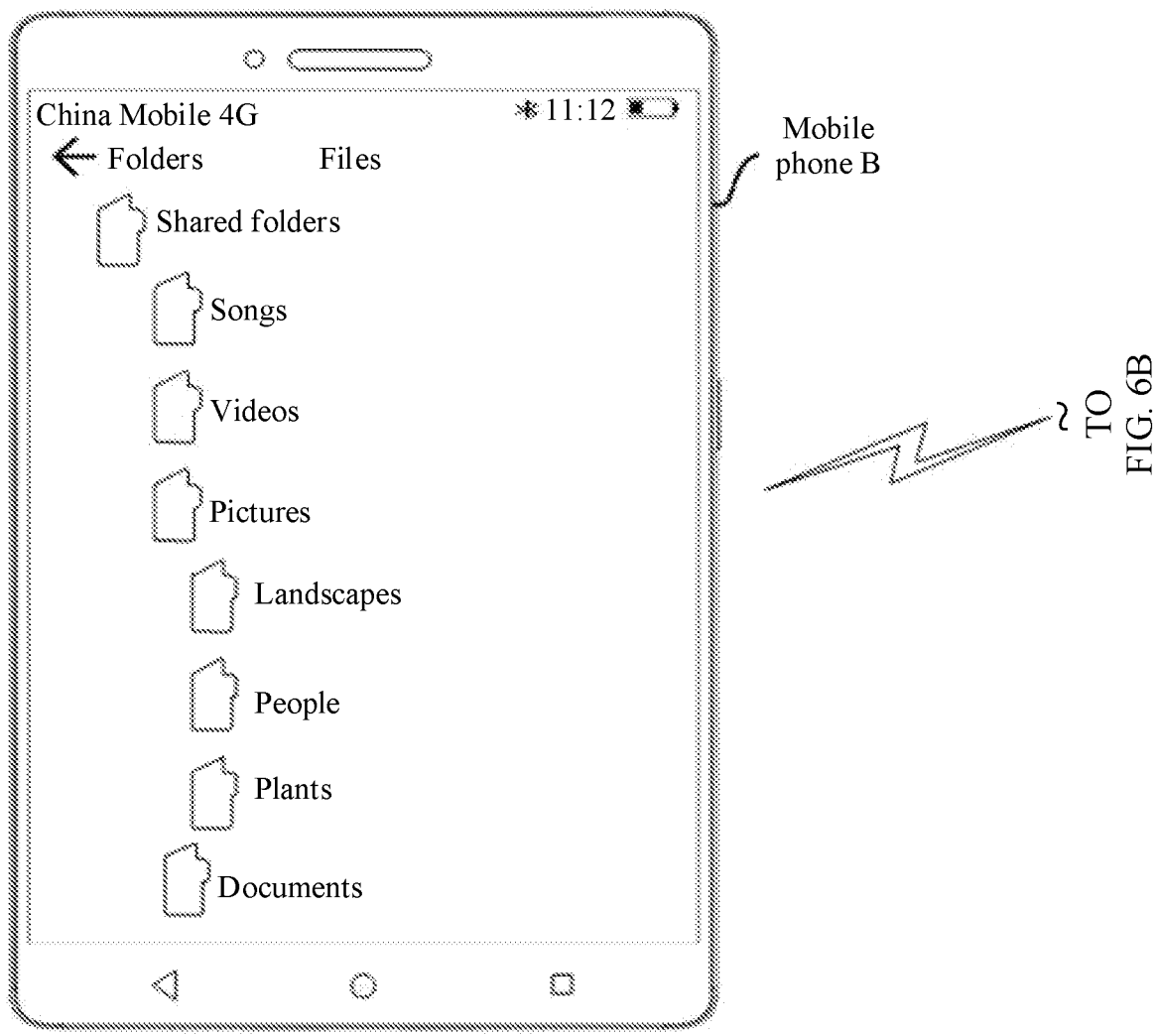
FIG. 6A and FIG. 6B are a group of schematic diagrams of a graphical user interface according to an embodiment of this application.
Figure 6B:
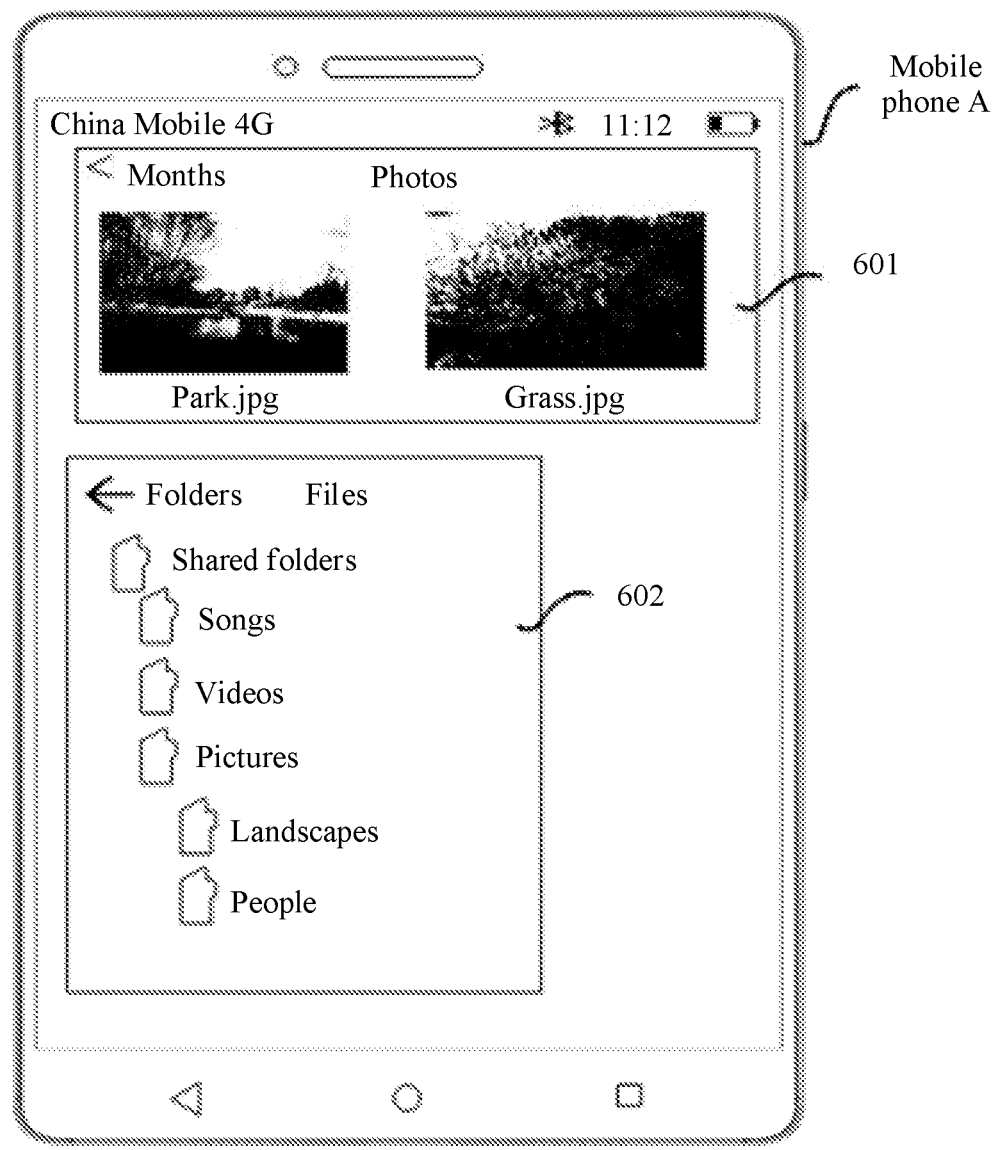
Figure 7A:
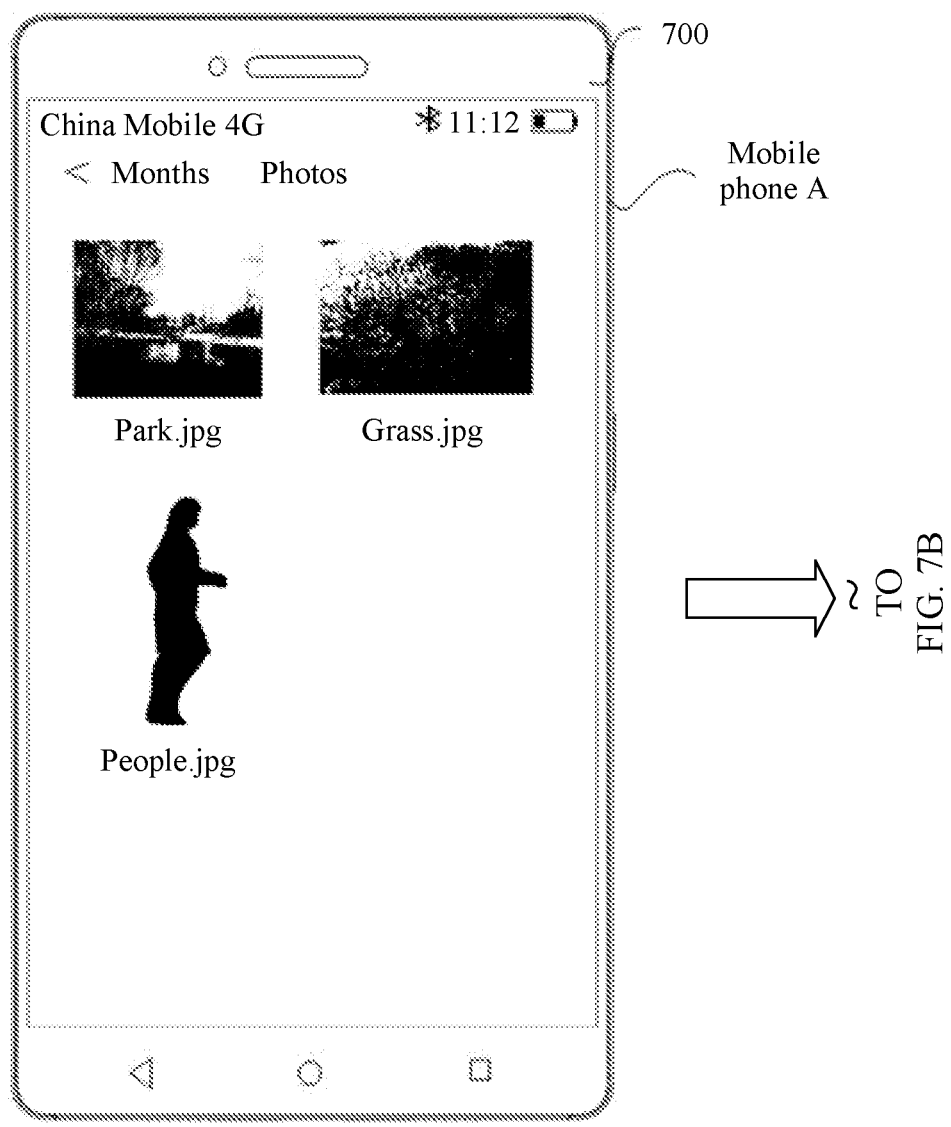
FIG. 7A, FIG. 7B, FIG. 7C, and FIG. 7D are a group of schematic diagrams of a graphical user interface according to an embodiment of this application.
Figure 7B:
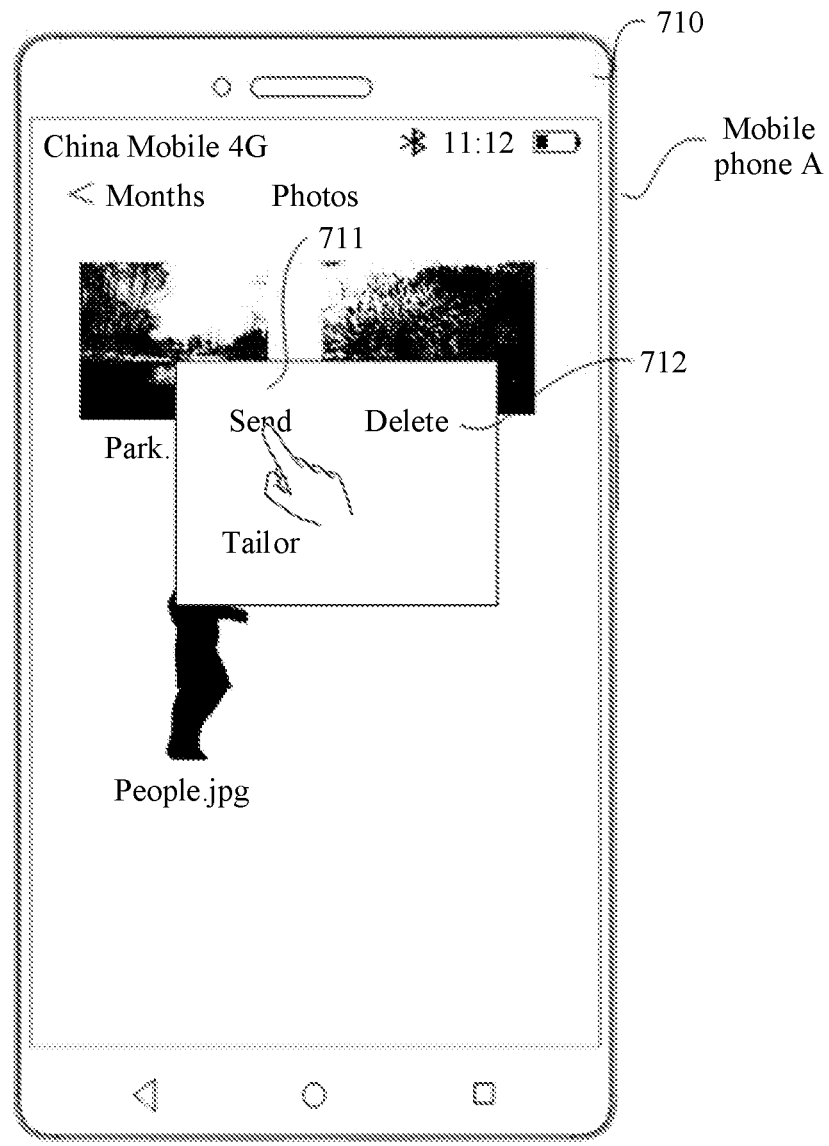
Figure 7C:
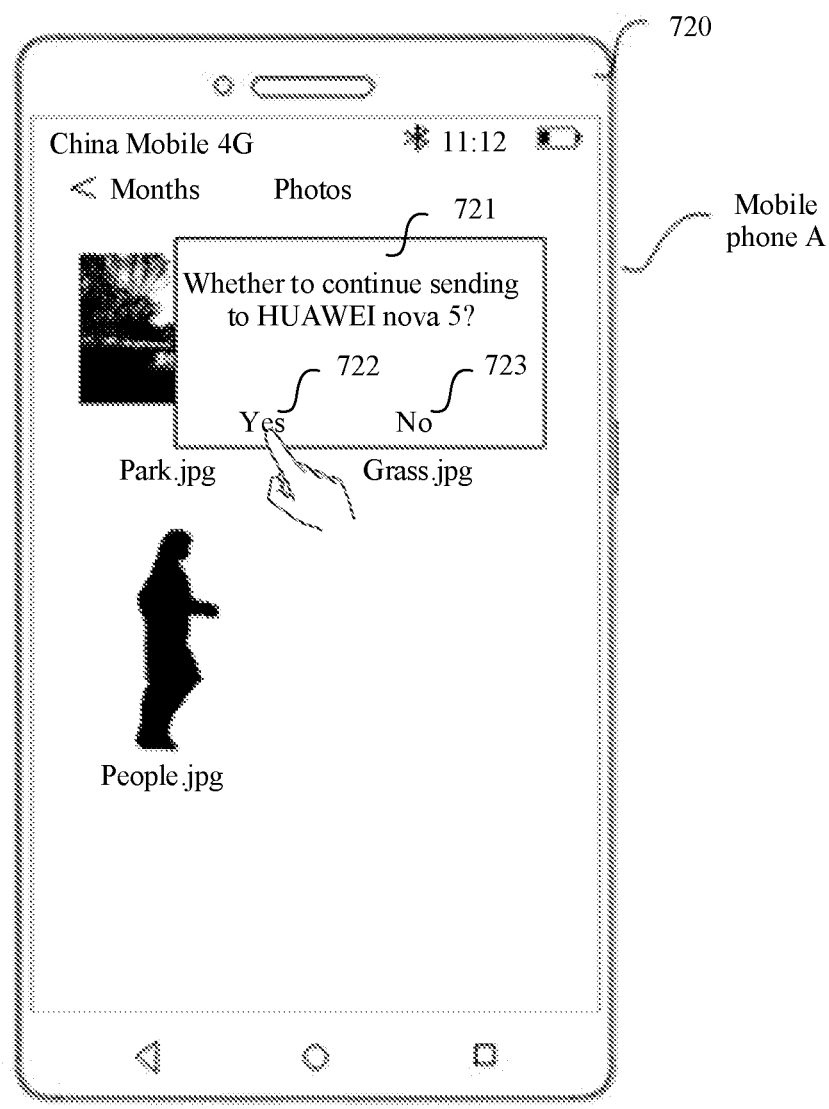
Figure 7D:
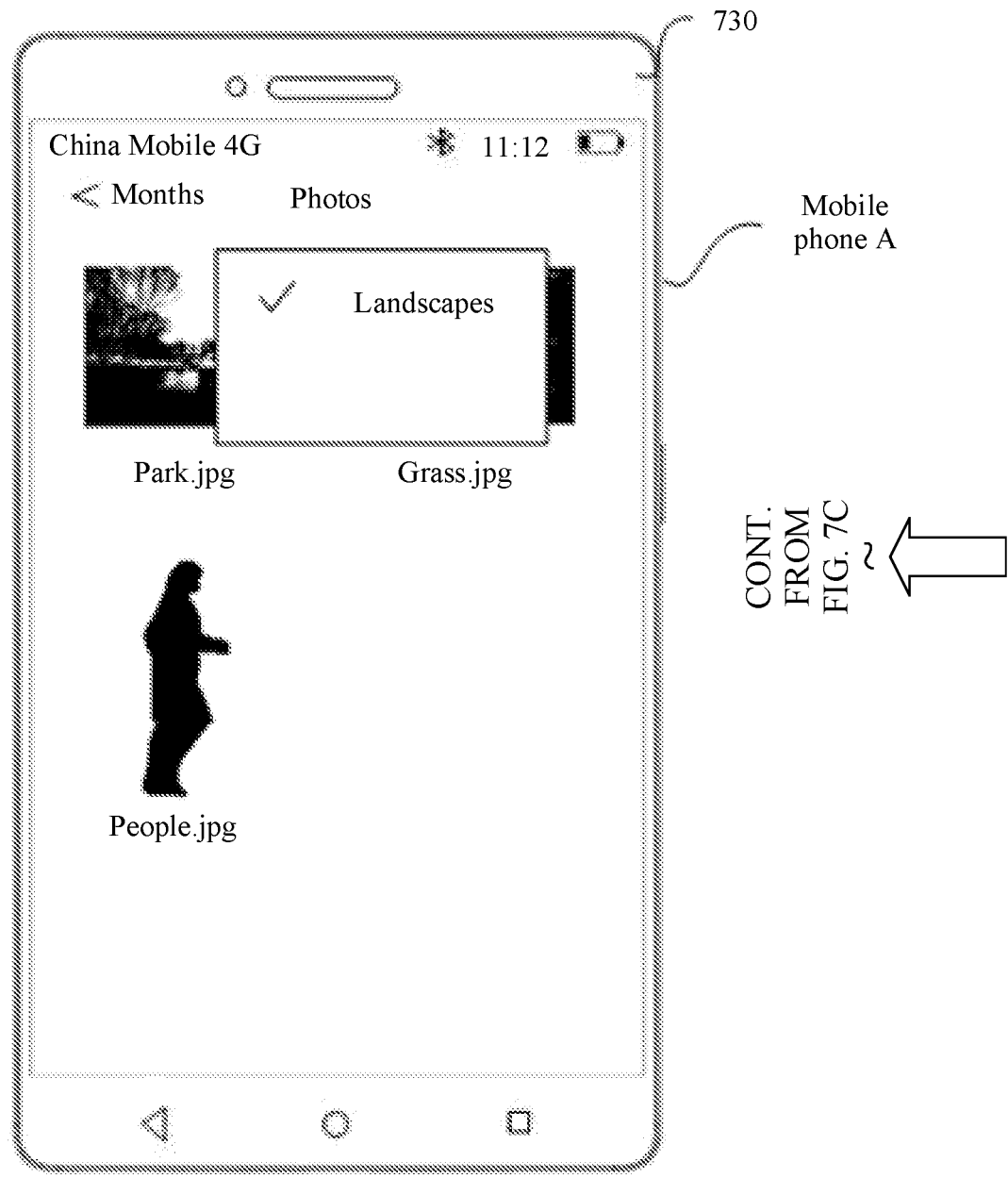
Figure 8A:
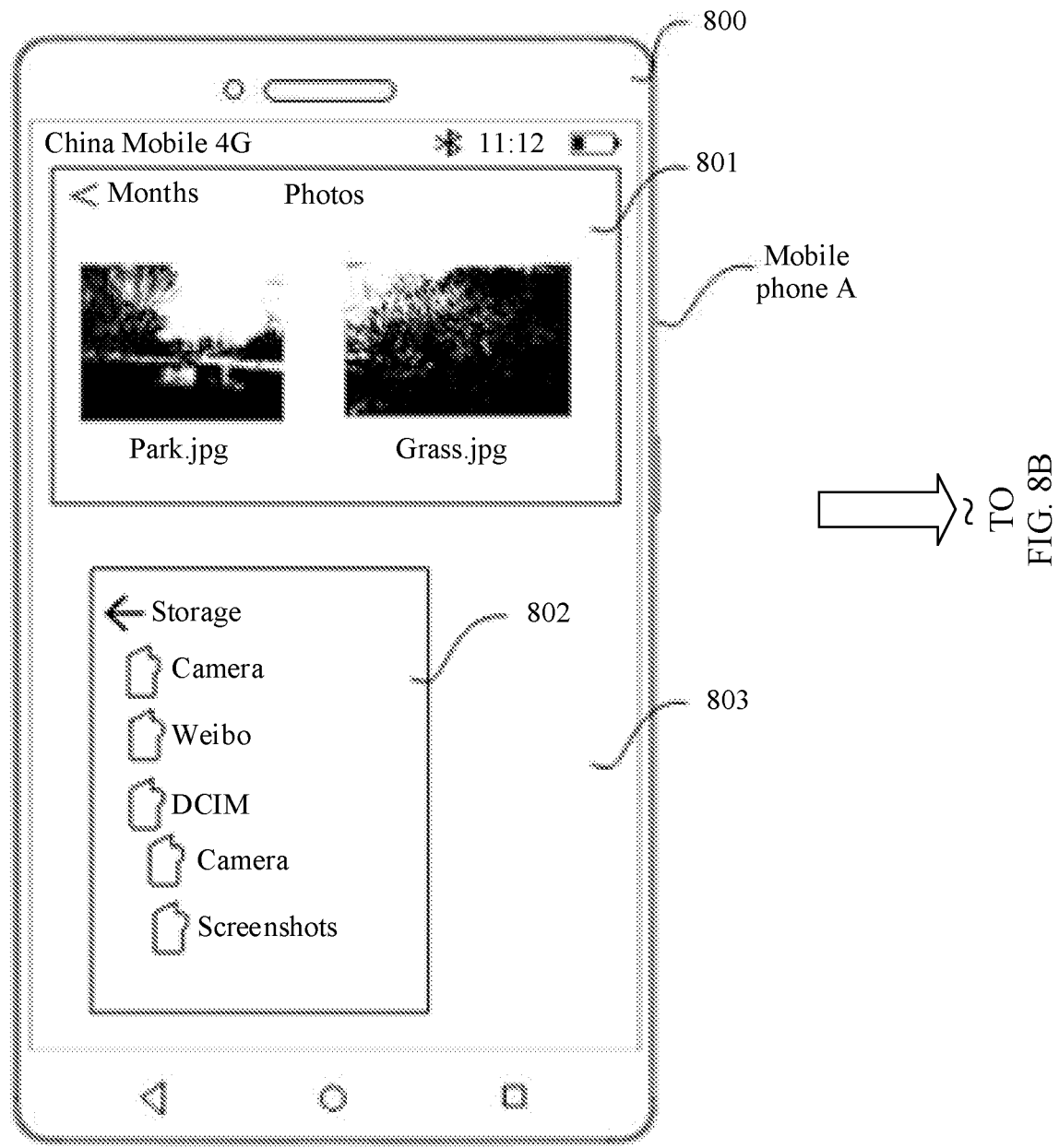
FIG. 8A, FIG. 8B, FIG. 8C, FIG. 8D, and FIG. 8E are a group of schematic diagrams of a graphical user interface according to an embodiment of this application.
Figure 8B:
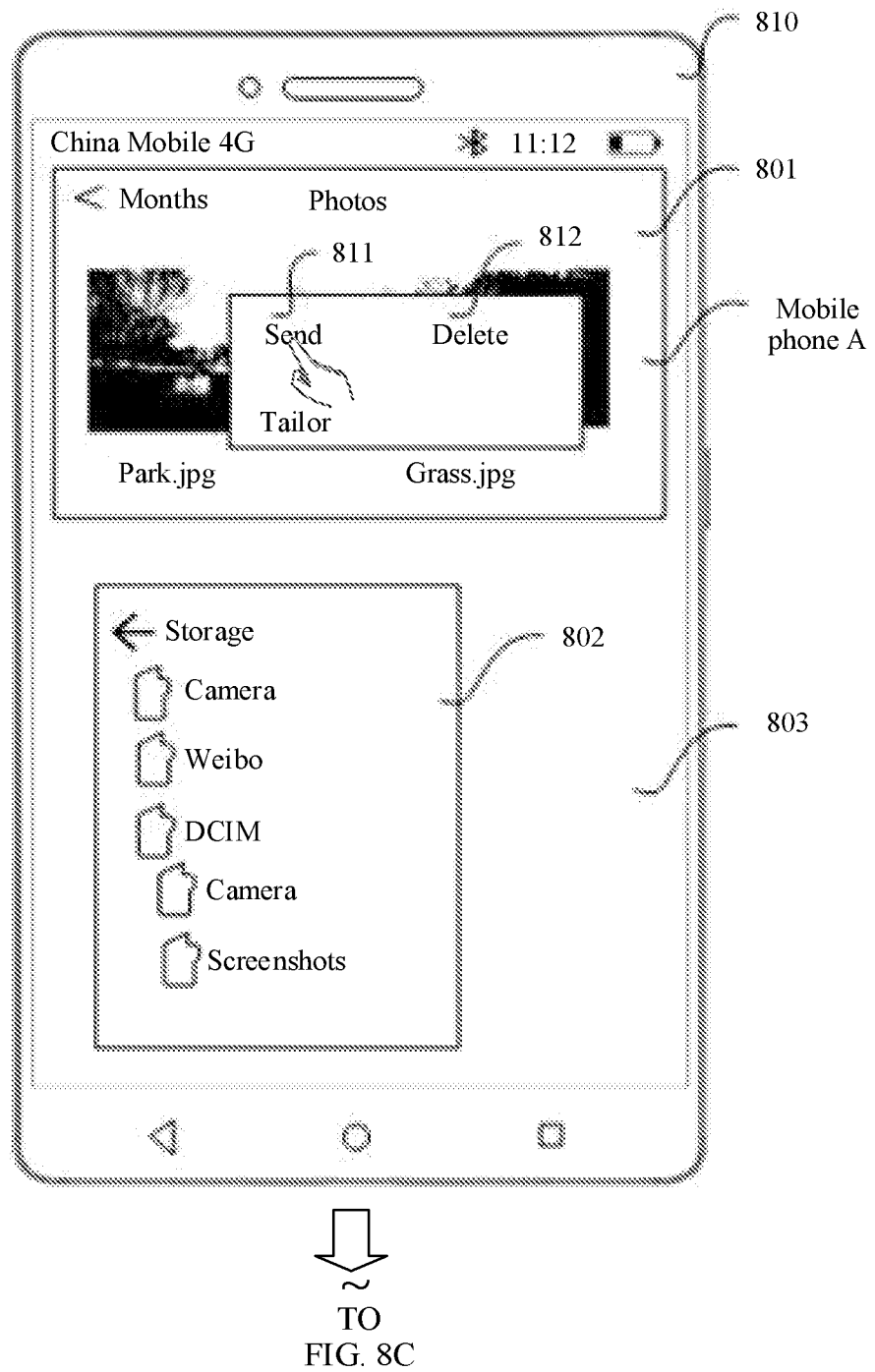
Figure 8C:
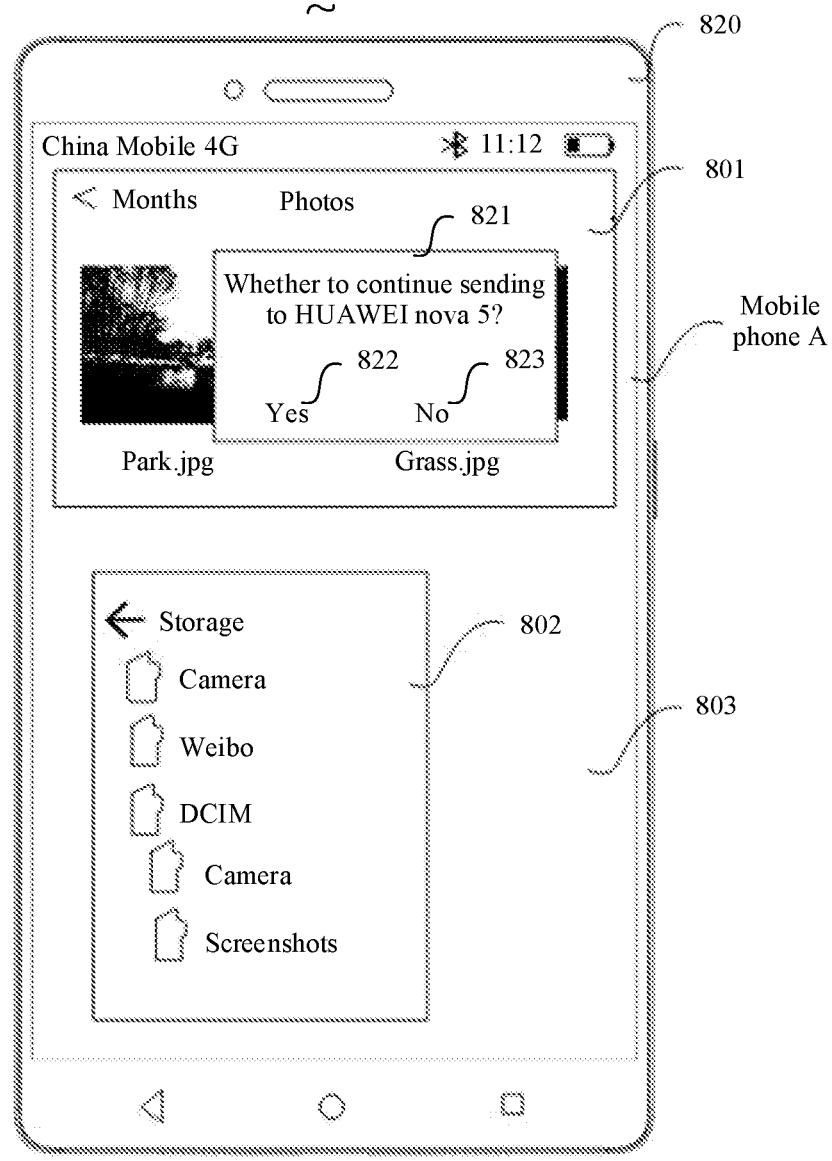
Figure 8D:
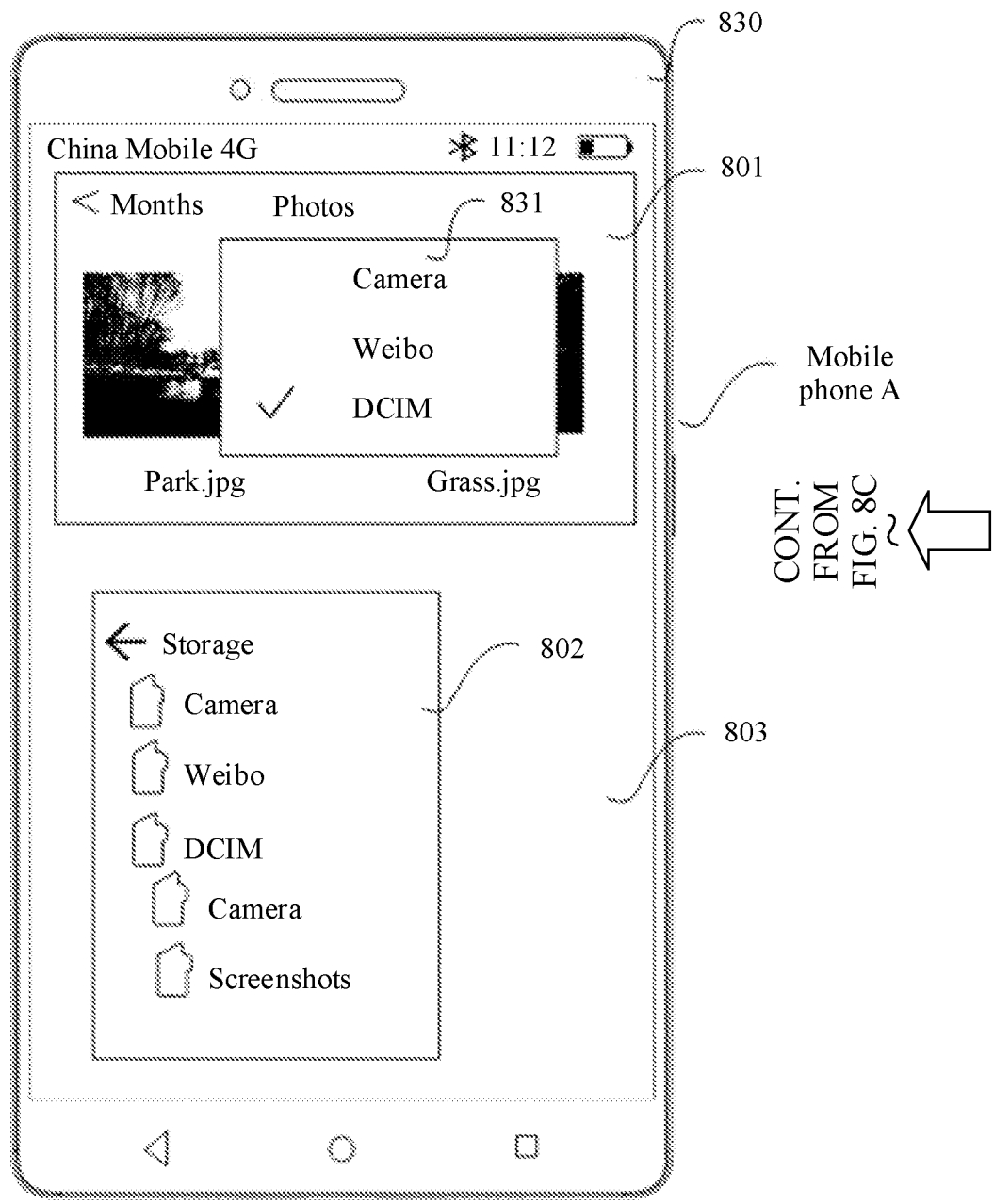
Figure 8E:
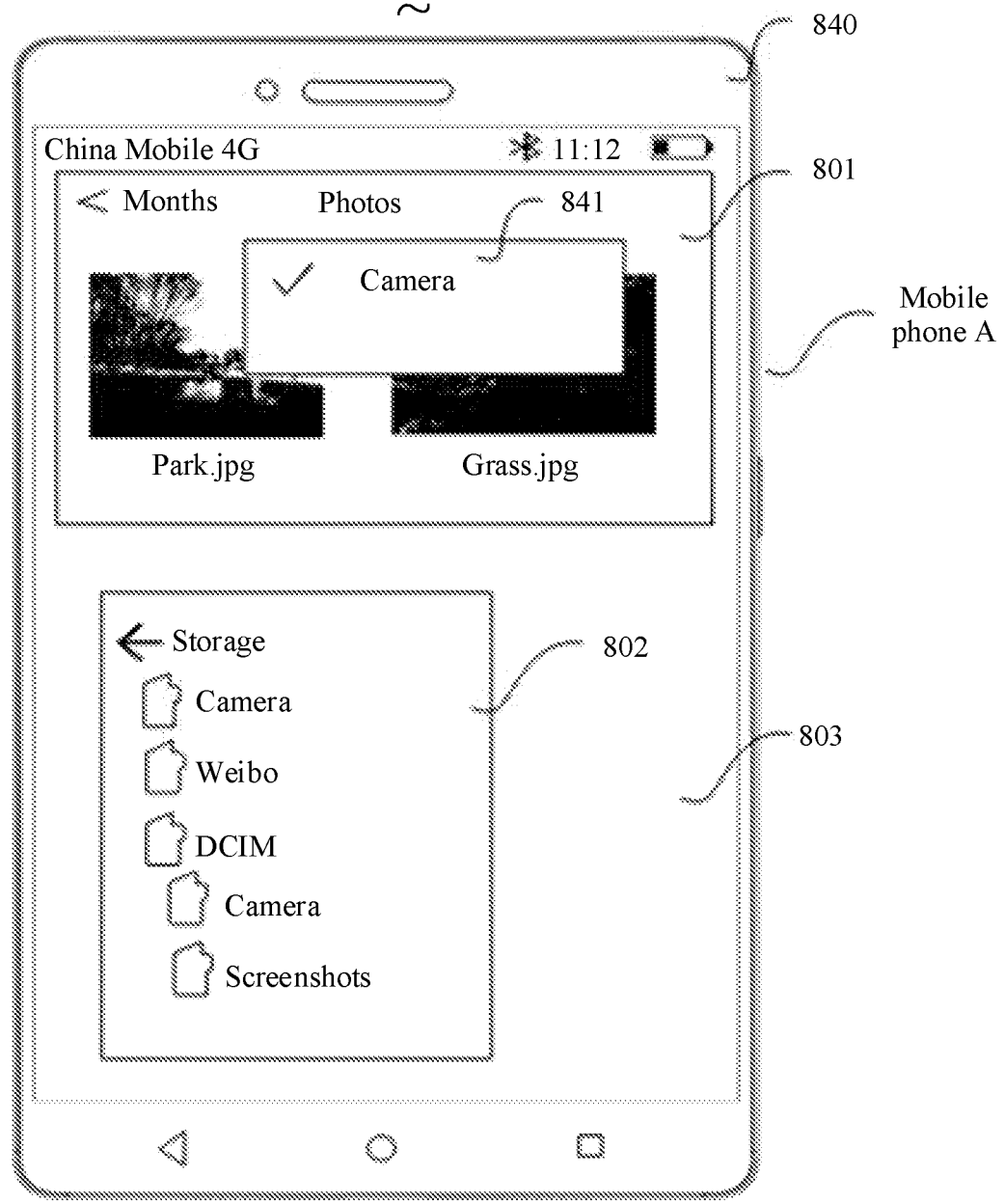

Second case: When the directory configuration information is directory information corresponding to a shared folder newly created by the user on the second terminal device, an example in which there are one local window and one another window is used to describe the file sharing method provided in this embodiment of this application. As shown in FIG. 6A and FIG. 6B, it is assumed that a folder that is named "Shared folder" and that is displayed on the mobile phone B is a folder newly created by the user on the mobile phone B, the newly created shared folder may include folders such as "Songs", "Videos", and "Pictures", and the folder named "Pictures" may further include folders such as "Landscapes", "People", and "Plants". In other words, the shared folder and the sub-folders included in the shared folder in the mobile phone B shown in FIG. 6A and FIG. 6B are all newly created folders.

Assuming that the mobile phone A (the first terminal device) establishes a connection to the mobile phone B (the second terminal device) through BLUETOOTH, after the connection is successfully established, a schematic diagram of the mobile phone A shown in FIG. 6A and FIG. 6B may be displayed on the display of the mobile phone A, to be specific, two windows are displayed on the display of the mobile phone A. A window 601 is a local window, and the other window 602 is another window.

It can be learned from the introduction of the application scenario in this embodiment of this application that a folder (a shared folder and a sub-folder) newly created by the user on the second terminal device may be used as a storage path of a to-be-received file. After the user sets the file storage path on the second terminal device, if the first terminal device is to share a picture with the second terminal device, the first terminal device may directly store the to-be-shared picture in a folder specified by the user B. For example, assuming that the mobile phone A is to share the picture named "Park" with the mobile phone B, and a picture storage path that is set by the user on the mobile phone B is: Storage/Pictures/Landscapes, the mobile phone A may directly store the picture named "Park" in the folder "Landscapes" of the mobile phone B.

In some embodiments of this application, it is assumed that the file storage path selected by the user on the second terminal includes a plurality of folders. In a possible implementation, when the first terminal device is to share a file with the second terminal device, the file may be automatically stored in a corresponding folder on the second terminal device based on a category to which the to-be-shared file belongs. For example, assuming that the user is to share the picture named "Park" in the mobile phone A with the mobile phone B, the mobile phone A may first determine a category to which the to-be-shared picture belongs, for example, may determine that the category corresponding to the picture named "Park" is "Landscapes". In this way, the mobile phone A may store, based on the determined category, the picture named "Park" in a corresponding folder in a shared folder directory of the mobile phone B, that is, the folder "Landscapes" in the folder "Pictures. Certainly, it may be understood that the foregoing example is described by using a picture as an example. Assuming that the user A is to share the picture named "Park" in the mobile phone A with the mobile phone B, the mobile phone A may first determine the category to which the to-be-shared file belongs, for example, may determine that the category to which the to-be-shared file belongs is "Pictures", and then may determine the category corresponding to the picture named "Park" is "Landscapes". In this way, the mobile phone A may store the picture named "Park" in the corresponding folder in the shared folder directory of the mobile phone B, that is, the folder "Landscapes" in the folder "Pictures".

The following describes the file sharing method in the first scenario with reference to specific interface display.

As shown in FIG. 7A to FIG. 7D, after the first terminal device (the mobile phone A) establishes the connection to the second terminal device (the mobile phone B), the user A may open a local photo in a local window, and a user interface 700 may be displayed on the display of the mobile phone A. It is assumed that the user A is to share the picture named "Park" with the mobile phone B (HUAWEI nova 5). In an example, the user A may select, in a touch and hold manner, the picture named "Park", and a user interface 710 may be displayed on the display of the mobile phone A. The user interface 710 includes a button "Send" 711, a button "Delete" 712, and the like. When the user taps the button "Send" 711, a user interface 720 is displayed on the display of the mobile phone A. The user interface 720 may include a prompt box "Whether to continue sending to HUAWEI nova 5" 721, a button "Yes" 722, and a button "No" 723. When the user selects the button "Yes", a user interface 730 may be displayed on the display of the mobile phone A. The user interface 730 may display a file storage path that is set by the user B on the mobile phone B. For example, if the picture storage path that is set by the user B on the mobile phone B is Pictures/Landscapes, the user A may select the storage path, so that the mobile phone A can store the picture named "Park" in the mobile phone B. Certainly, it may be understood that the user interface 730 shown in FIG. 7A to FIG. 7D may display a folder "Landscapes" shown in the figure, or may display "Pictures/Landscapes".

It should be noted that, in the scenario shown in FIG. 7A to FIG. 7D, the mobile phone B may not send a photo of the directory information to the mobile phone A, in other words, the directory information of the mobile phone B is not displayed on the user interface 700, and based on the storage path selected by the user B, the file may be alternatively directly stored in the folder specified by the mobile phone B.

Certainly, the mobile phone A may alternatively determine the picture storage path based on the category to which the picture belongs. For example, if it is determined that the picture named "Park" belongs to the landscape category, the user interface 730 may alternatively be displayed on the display of the mobile phone A, so that the user A determines whether the picture needs to be stored in the folder "Landscapes" of the mobile phone B.

As shown in FIG. 8A to FIG. 8E, after the mobile phone A establishes the connection to the mobile phone B, the mobile phone B may send picture information of a file directory to the mobile phone A. After the mobile phone A receives the picture information of the file directory, a user interface 800 may be displayed on the display of the mobile phone A. The user interface 800 includes a local window 801 and another window 802. It should be noted that the interface 801 of the mobile phone A and the interface 802 of the mobile phone B may be displayed in a window form. If a screen of the mobile phone A is not entirely occupied when the interface 801 of the mobile phone A and the interface 802 of the mobile phone B are displayed in the window form, the user interface 800 may further include another area 803. The other area 803 may be a desktop background on the display of the mobile phone A. Certainly, the other area 803 is not limited to the desktop background. This is not limited in this application.

An example in which the interface of the mobile phone A includes two pictures such as two pictures named "Park" and "Grass" is still used. The second terminal device may send the file directory to the mobile phone A in a picture form, so that the mobile phone A displays the interface 802 of the second terminal device. For example, the mobile phone B may take a snapshot of a file directory interface. The file directory interface may include a folder icon and an identifier corresponding to the icon. The user A may select, on the display of the mobile phone A, one picture from the window in which the interface 801 of the mobile phone A is located and share the picture with the mobile phone B (HUAWEI nova 5). In an example, the user may select the picture named "Park". For example, the user selects, in a touch and hold manner, the picture named "Park", and a user interface 810 may be displayed on the display of the first terminal device. The user interface 810 includes a button "Send" 811, a button "Delete" 812, and the like. After the user taps the button "Send" 811, a user interface 820 may be displayed on the display of the mobile phone A. The user interface 820 includes a prompt box "Whether to continue sending to HUAWEI nova 5" 821, a button "Yes" 822, and a button "No" 823. After the user taps the button "Yes" 822, a user interface 830 may be displayed on the display of the mobile phone A. The user interface 830 includes a prompt box 831. The prompt box 831 is a directory list displayed in the window 802. When the user selects one item, for example, selects a DCIM option, the picture named "Park" may be stored in a corresponding DCIM folder in the terminal device identified as HUAWEI nova 5. It should be noted that, in FIG. 8A to FIG. 8E, because directory information in the window 802 is displayed in a picture form, the prompt box 831 is popped up. This can help the user select a file storage path, thereby improving user experience.

In some other embodiments, after the user interface 820 is displayed on the display of the mobile phone A, the user may tap the button "Yes" 822. In this case, the mobile phone A may determine the file storage path based on the window 802 (the directory information of the mobile phone B). Assuming that a file to be shared by the mobile phone A is the picture named "Park", and a picture storage path that is set by the user on the mobile phone B is a folder included in the window 802, the mobile phone A may determine the picture storage path by using a picture recognition technology, for example, may store the picture in a folder "Camera". In this case, a user interface 840 may be displayed on the display of the mobile phone A. The user interface 840 includes a prompt box 841. After the user selects the prompt box, the picture named "Park" may be stored in the folder "Camera" of the mobile phone B.

In another possible implementation, assuming that the user wants to share a picture named "Grass" in the mobile phone A with the mobile phone B, the mobile phone A may determine a picture storage path based on the picture name. FIG. 5A and FIG. 5B are used as an example. For example, the mobile phone A may recognize that the picture named "Grass" is a landscape. In this scenario, the window 502 is displayed on the interface of the mobile phone A in a photo form. Therefore, the mobile phone A may automatically store the picture named "Grass" in the folder "Landscapes" of the mobile phone B. Certainly, it may be understood that, if another picture is pre-stored in the folder "Landscapes" of the mobile phone B, the picture named "Grass" is added to the folder "Landscapes". If no other picture is pre-stored in the folder "Landscapes" of the mobile phone B, there is only one picture in the folder "Landscapes", that is, the picture named "Grass".

For another example, assuming that a picture is named "Zhang San", and the user wants to share the picture named "Zhang San" in the mobile phone A with the mobile phone B, the mobile phone A may determine a picture storage path based on the picture name. The mobile phone A may recognize that the word "Zhang San" is a person name. In this case, the picture named "Zhang San" may be stored in the folder "People" of the mobile phone B.

For example, a type of a to-be-shared file is audio. Assuming that a file to be shared by the first terminal device is audio, the first terminal device may determine an audio storage path based on a file name extension. For example, if the extension of the to-be-shared audio is .mp3, the audio may be stored in the folder "Songs". For another example, assuming that a file to be shared by the first terminal device is a video, the first terminal device may determine a video storage path based on a file name extension. For example, if the extension of the to-be-shared video is .mp4, the video may be stored in the folder "Videos". Certainly, the manner of determining the file storage path is not limited to the foregoing manners. For example, the file storage path may alternatively be determined based on a file name. This is not limited in this application.

Figure 9A:
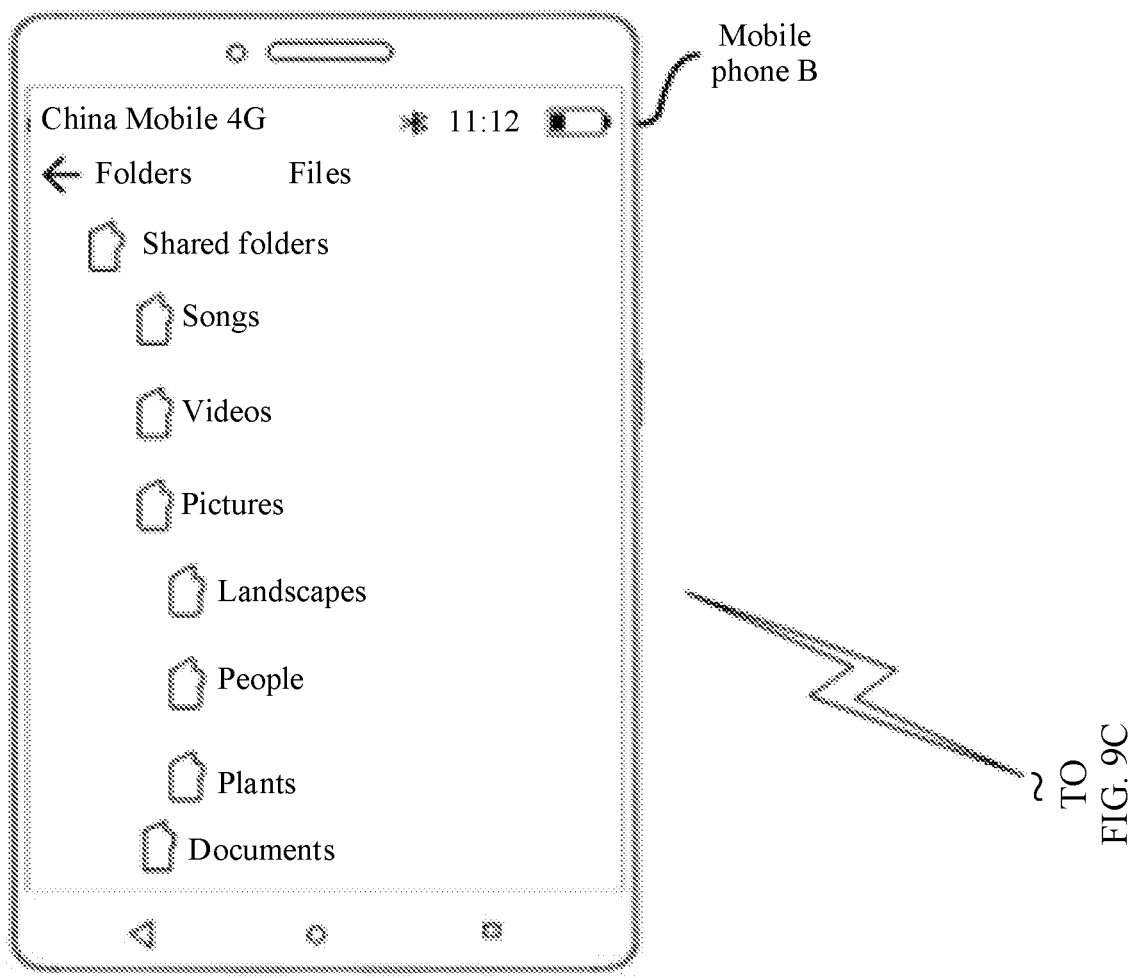
FIG. 9A, FIG. 9B, and FIG. 9C are a group of schematic diagrams of a graphical user interface according to an embodiment of this application.
Figure 9B:
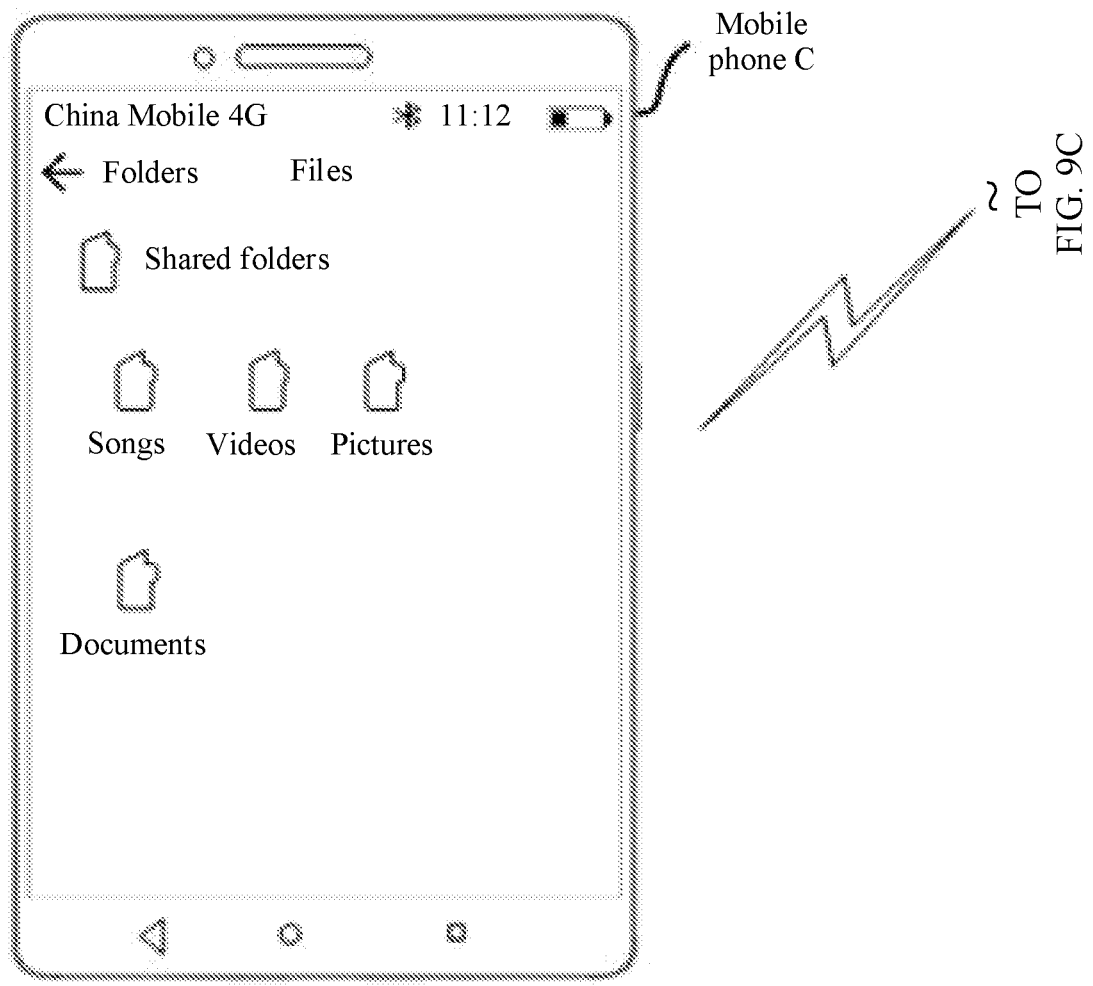
Figure 9C:
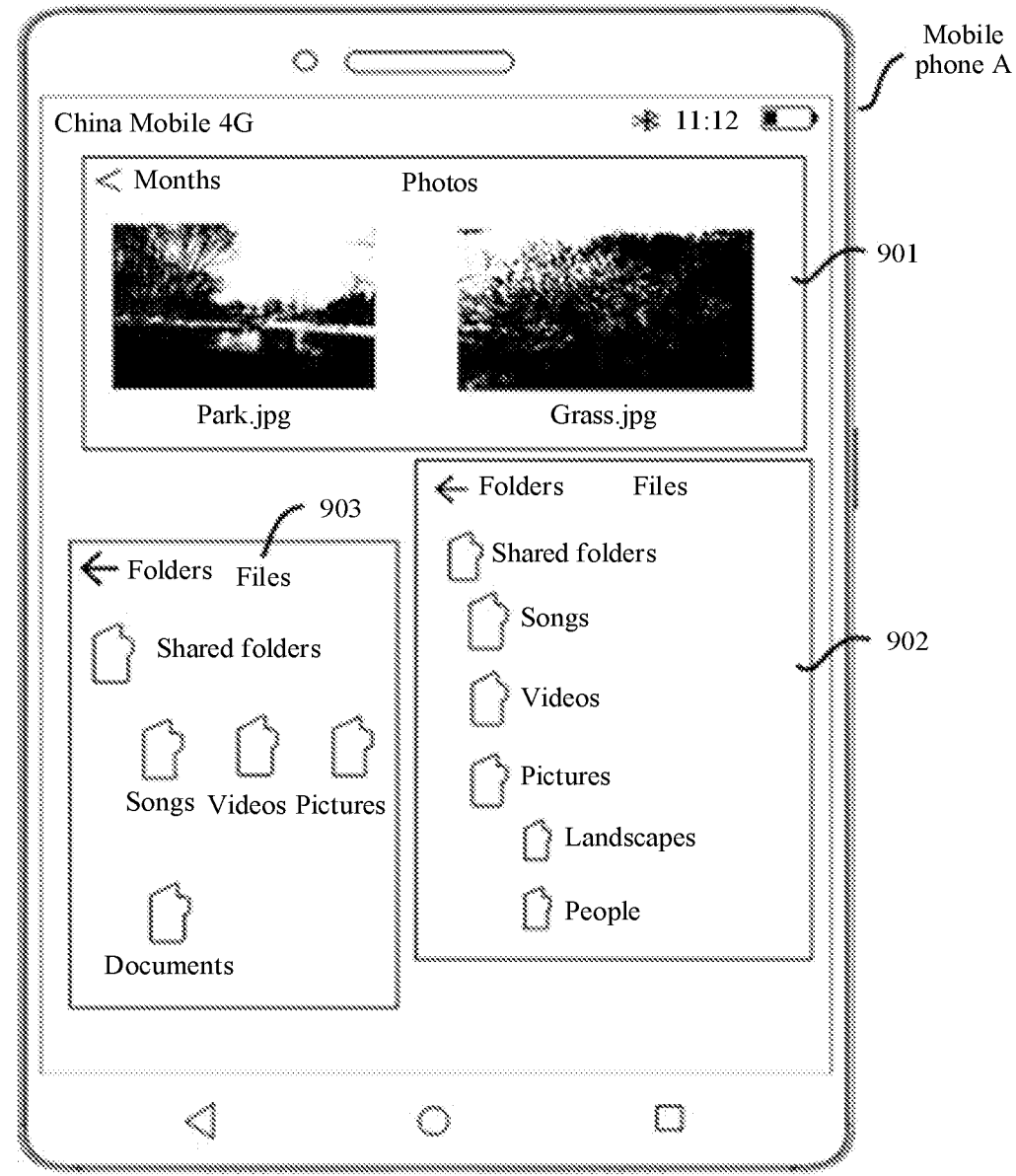

An example in which there are one local window and two other windows is used below for description. When there is a plurality of second terminal devices, the first terminal device may share a same file with the plurality of different second terminal devices. After the first terminal device is successfully connected to the plurality of different second terminal devices, a plurality of windows may be displayed on the first terminal device. The one local window displays an interface of a local file of the first terminal device, and the other windows respectively display shared folder directories of the plurality of second terminal devices. As shown in FIG. 9A to FIG. 9C, it is assumed that the mobile phone B and a mobile phone C are the second terminal devices, and the mobile phone A is the first terminal device. After the mobile phone A separately establishes a connection to the mobile phone B and the mobile phone C through BLUETOOTH, three windows may be displayed on the display of the mobile phone A: a window 901, a window 902, and a window 903. The local window 901 displays pictures in the mobile phone A, for example, the two pictures named "Park" and "Grass". The window 902 displays a shared folder directory of the mobile phone B. The window 903 displays a shared folder directory of the mobile phone C. It should be noted that a form of the shared folder directory of the second terminal device is not limited to the forms shown in FIG. 6A and FIG. 6B and FIG. 9A to FIG. 9C, and may alternatively be another form. For example, the shared folder directory is displayed in a list form. This is not limited in this application.

After the shared folder directory of the second terminal device is displayed on the display of the first terminal device through projection, the first terminal device may send a to-be-shared file to the two different second terminal devices. In an example, the mobile phone A may store the picture named "Park" of the window 901 in a folder "Landscapes" in the window 902, and store the picture named "Grass" in a folder "Pictures" in the window 903. Certainly, it may be understood that the picture named "Grass" may alternatively be stored in the folder "Landscapes" in the window 902, and the picture named "Park" may be stored in the folder "Pictures" in the window 903. Alternatively, the two pictures named "Park" and "Grass" may be simultaneously stored in the folder "Landscapes" in the window 902, and the two pictures named "Park" and "Grass" may be stored in the folder "Pictures" in the window 903.

Figure 10:
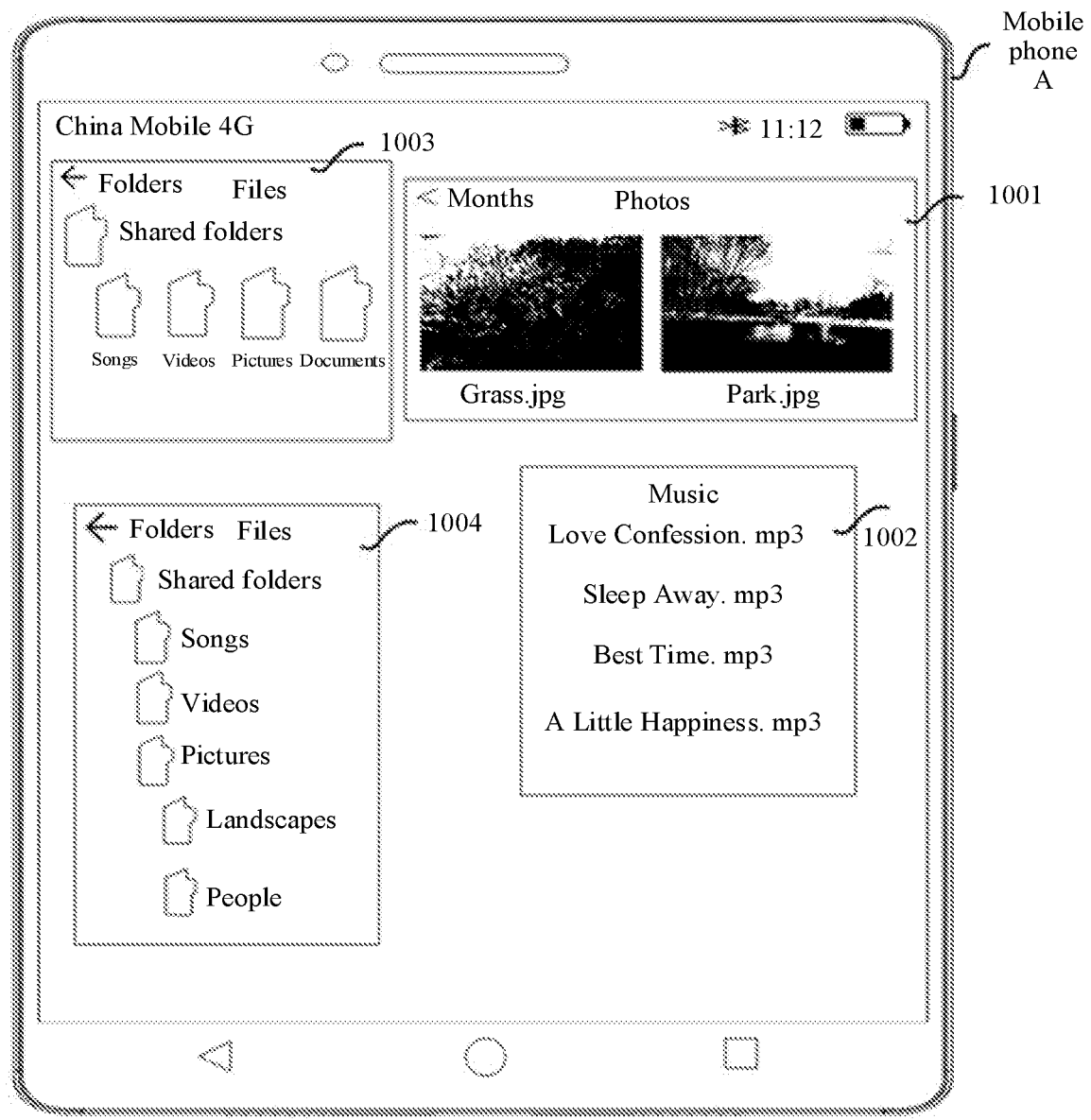
FIG. 10 is a schematic diagram of a graphical user interface according to an embodiment of this application.

As shown in FIG. 10, when there is a plurality of second terminal devices, the first terminal device may share different local files with the different second terminal devices. FIG. 10 is a schematic diagram of an interface of the mobile phone A. It is assumed that a file to be shared by the mobile phone A includes a picture and a song, in other words, there are two local windows. After the mobile phone A is connected to the mobile phone B and the mobile phone C through BLUETOOTH, four windows may be displayed on the display of the mobile phone A: a window 1001, a window 1002, a window 1003, and a window 1004. The window 1001 and the window 1002 are local windows. The window 1001 is a picture of the mobile phone A. The window 1002 is music of the mobile phone A. The window 1003 is a shared folder directory interface of the mobile phone B. The window 1004 is a shared folder directory interface of the mobile phone C. The mobile phone A may store the picture named "Grass" of the window 1001 in a folder "Pictures" in a shared folder directory in the window 1003, and may store audio named "Love Confession" of the window 1002 in a folder "Songs" in a shared folder directory of the window 1004. This implements file sharing between different terminal devices. Certainly, it may be understood that the mobile phone A may alternatively store the picture named "Grass" in a folder "Landscapes" in the window 1004, and may store the audio named "Love Confession" of the window 1002 in a folder "Songs" in the window 1003.

Figure 11:
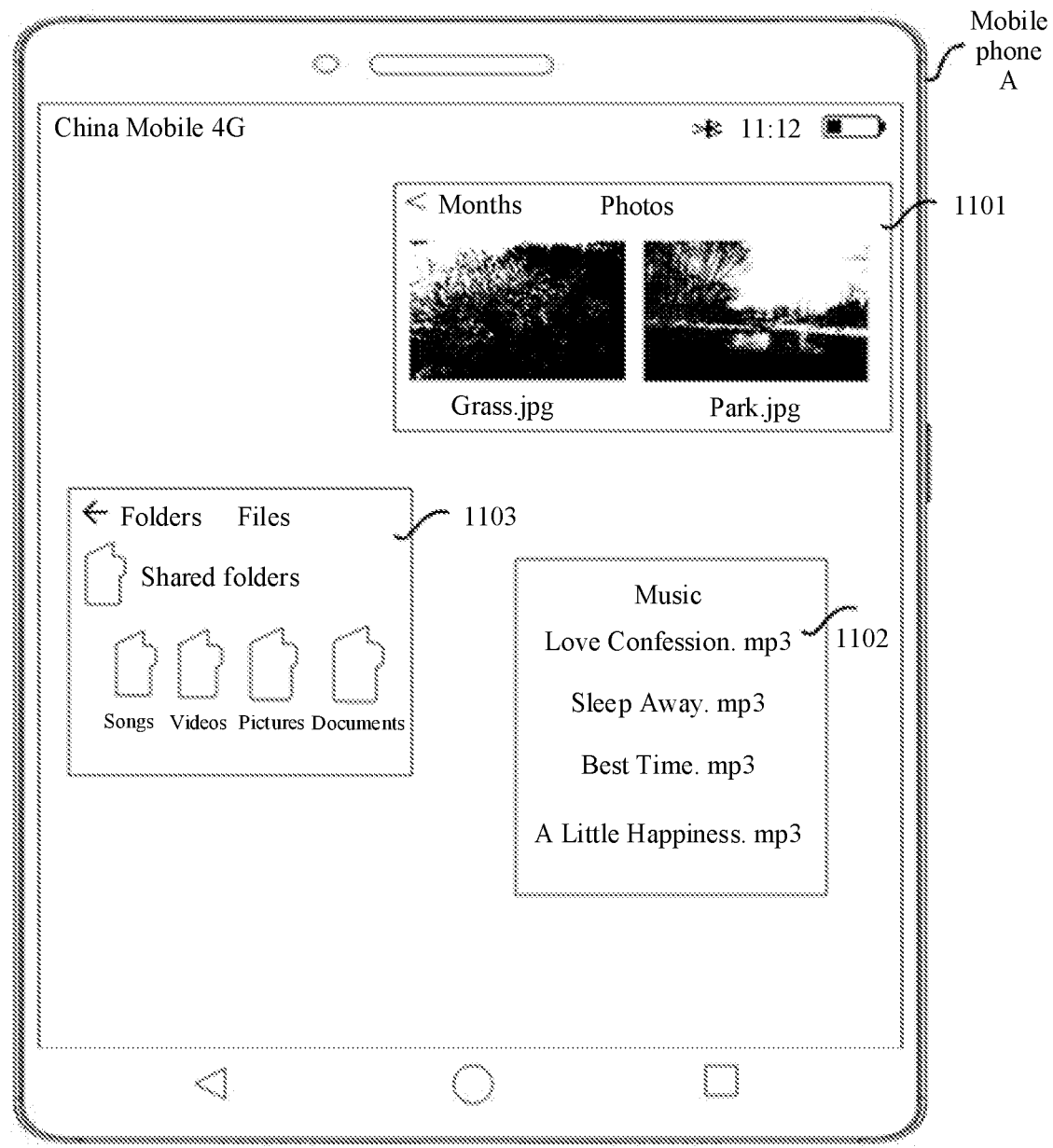
FIG. 11 is a schematic diagram of a graphical user interface according to an embodiment of this application.

Further, it is assumed that there is one second terminal device, and files to be shared by the first terminal device are a picture and music, in other words, there are two local windows and one another window. FIG. 11 is a schematic diagram of an interface of the mobile phone A. Alternatively, the first terminal device may simultaneously store files in folders "Pictures" and "Songs" of the first terminal device in a corresponding folder in a window of the second terminal device. For example, the mobile phone A may store the picture named "Park" of the window 1101 in the folder "Pictures" in the window 1103, and store an audio file named "A Little Happiness" in the folder "Songs" in the window 1103.

It may be understood that a window size in the schematic diagrams of the interfaces shown in FIG. 5A and FIG. 5B to FIG. 11 may be adjusted. For a specific operation in a scenario in which there are a plurality of local windows and a plurality of other windows, refer to the schematic diagrams of the user interfaces shown in FIG. 7A to FIG. 7D and FIG. 8A to FIG. 8E. Details are not described herein again.

Second scenario: After the first terminal device establishes the connection to the second terminal device, in a possible implementation, the second terminal device may send a projection request message to the first terminal device. The projection request message may carry identification information of the second terminal device.

After receiving the projection request message, the first terminal device may feed back a message that agrees to accept the projection request to the second terminal device. In this case, a plurality of windows may be displayed on the display of the first terminal device. For example, when there is one second terminal device, two windows are displayed, including a local window and another window. The other window may be used to display an interface of the second terminal device, and the local window may be used to display an interface of the first terminal device. It should be noted that, after receiving the projection request message, the first terminal device may alternatively perform authentication and verification on the second terminal device based on the identification information of the second terminal device. For details, refer to the descriptions in the first scenario. Details are not described herein again. In this scenario, the user may share a file between a plurality of windows displayed on the first terminal device. In this application, the user may drag a file between different windows to share the file with another terminal device.

In another possible implementation, the first terminal device may alternatively send a control request message to the second terminal device. After receiving the control request message, the second terminal device may agree to the control request message. In this case, the local window and the other window may be displayed on the display of the first terminal device.

When there are one local window and one another window, for example, as shown in FIG. 6A and FIG. 6B, assuming that the mobile phone A is to share the picture named "Park" in the window 601 with the mobile phone B, the user A may directly drag the picture named "Park" in the local window 601 to the folder "Landscapes" in the other window 602. In this scenario, the user may independently select a picture storage path. This can improve user experience. Compared with the first scenario, the user does not need to preset a storage path on the mobile phone B, and the mobile phone A does not need to determine a picture storage path based on a picture category or the like.

When there are one local window and a plurality of other windows, the first terminal device may share a same file with a plurality of different second terminal devices. FIG. 9A to FIG. 9C are used as an example. On the display of the mobile phone A shown in FIG. 9A to FIG. 9C, the user A may drag the picture named "Park" in the local window 901 to the folder "Landscapes" in the window 902 of the mobile phone B, and drag the picture named "Grass" in the local window 901 to the folder "Pictures" in the window 903 of the mobile phone C. In this way, the two pictures named "Park" and "Grass" stored in the mobile phone A can be shared with the mobile phone B and the mobile phone C.

When there are a plurality of local windows and a plurality of other windows, the first terminal device may share different local files with different second terminal devices. FIG. 10 is used as an example. Assuming that files to be shared by the mobile phone A are a picture (named "Park") and a song (named "A Little Happiness"), the user may drag the picture named "Park" in the local window 1001 to the folder "Pictures" in the window 1003, and drag the audio named "A Little Happiness" in the window 1002 to the folder "Songs" in the window 1004.

When there are a plurality of local windows and one another window, as shown in FIG. 11, the user may drag the picture named "Park" in the local window 1101 to the folder "Landscapes" in the window 1103, and drag the audio named "A Little Happiness" in the local window 1102 to the folder "Songs" in the window 1103.

Certainly, it may be understood that the storage path may be set based on a user habit or the like. This is not limited in this application.

Further, in the foregoing descriptions, the first terminal device serves as a transmit end and the second terminal device serves as a receive end. In this scenario, after the interface of the second terminal device is displayed on the display of the first terminal device through projection, the user may also share a file stored in the memory of the second terminal device with the first terminal device. To be specific, the user may also drag, from the other window, the file stored in the second terminal device to the local window, in other words, store the file in the first terminal device.

The following describes the file sharing method in the second scenario with reference to a user operation and user interface display.

Figure 12A:
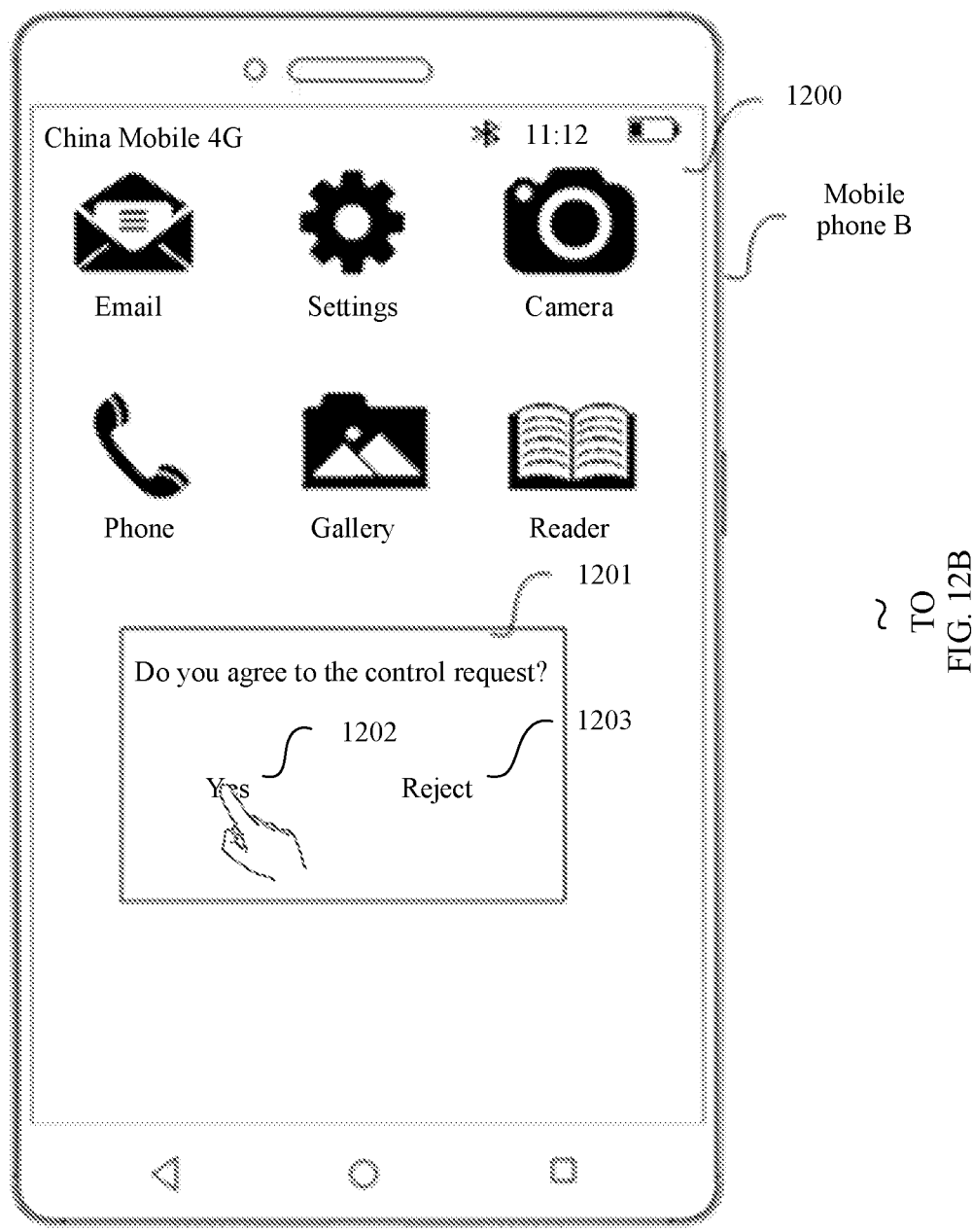
FIG. 12A and FIG. 12B are schematic diagrams of a graphical user interface according to an embodiment of this application.
Figure 12B:
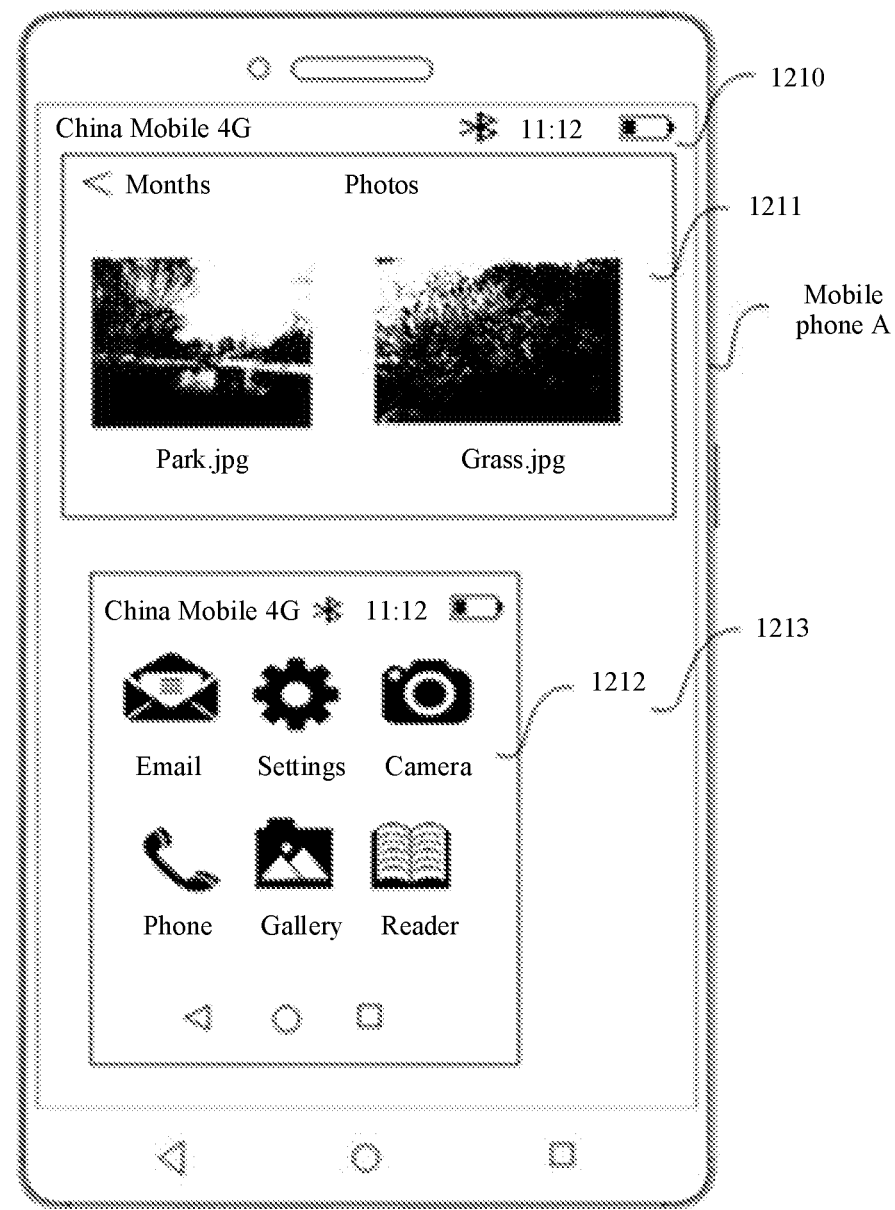

For example, as shown in FIG. 12A and FIG. 12B, after the first terminal device (the mobile phone A) establishes the connection to the second terminal device (the mobile phone B), the mobile phone A may send a control request message to the mobile phone B. After receiving the control request message, the mobile phone B may display a user interface 1200 on the display of the mobile phone B. The user interface 1200 includes a prompt box "Do you agree to the control request" 1201, a button "Agree" 1202, and a button "Reject" 1203. The user B may tap the button "Agree" 1202 on the user interface 1200, so that a user interface 1210 can be displayed on the display of the mobile phone A. The user interface 1210 may include an interface 1211 of the mobile phone A and an interface 1212 of the mobile phone B. In addition, when the user interface 1210 is displayed on the display of the mobile phone A, the user interface displayed on the display of the mobile phone B may display the interface 1200, or may display an application interface, for example, a chat interface of WeChat or a video download interface.

It should be noted that the interface 1211 of the mobile phone A and the interface 1212 of the mobile phone B may be separately displayed in a window form. If the display of the mobile phone A is not entirely occupied, the user interface 1210 may further include another area 1213. The other area 1213 may be a desktop background on the display of the mobile phone A. Certainly, the other area 1213 is not limited to the desktop background. This is not limited in this application.

It is assumed that the interface 1211 of the mobile phone A on the user interface 1210 includes two pictures such as two pictures named "Park" and "Grass". Because the user A may perform an operation on a file in the mobile phone A, the interface 1212 of the mobile phone B may be displayed based on the operation performed by the user A. The interface of the mobile phone B shown in FIG. 12A and FIG. 12B is a home screen that displays all application icons. For example, the user A may directly drag the picture named "Park" on the interface 1211 to Gallery on the interface 1212, so that a picture in the mobile phone A can be shared with the mobile phone B.

In addition, the user A may also tap an icon of gallery on the interface 1212 to open Gallery on the mobile phone B. In this case, a picture stored in the mobile phone B may be displayed on the interface 1212, and the user A may also select a picture in the mobile phone B and drag the picture to the interface 1211 to share the picture in the mobile phone B with the mobile phone A. It should be noted that a picture included in the interface 1211 of the mobile phone A is found by the user A on the mobile phone A based on a picture storage path.

In some embodiments, assuming that the user B performs an operation on the mobile phone B, for example, opens an application, the user interface 1212 included in the user interface of the mobile phone A may also synchronously display a user interface opened by the user B on the mobile phone B.

Figure 13A:
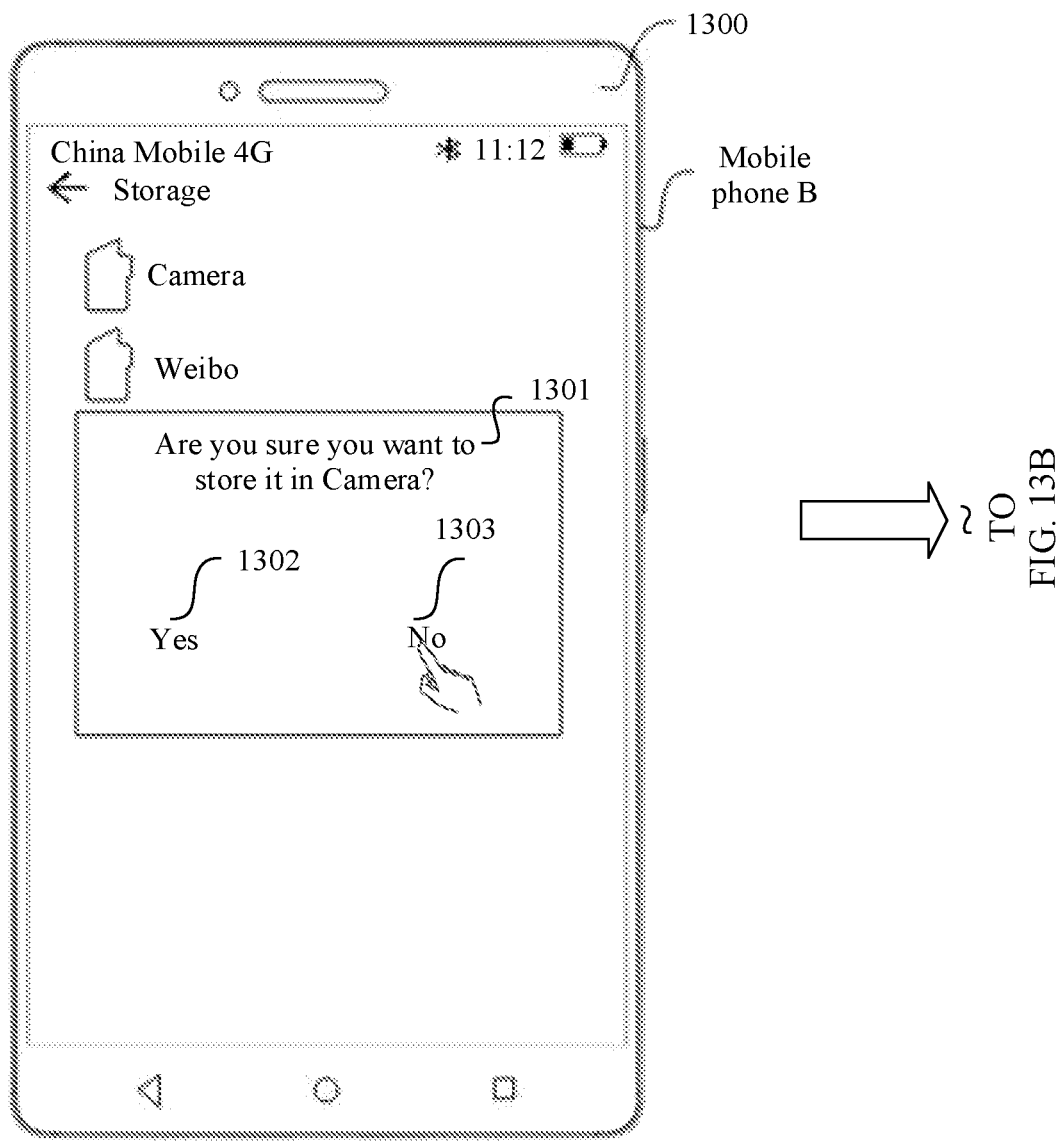
FIG. 13A and FIG. 13B are a group of schematic diagrams of a graphical user interface according to an embodiment of this application.
Figure 13B:
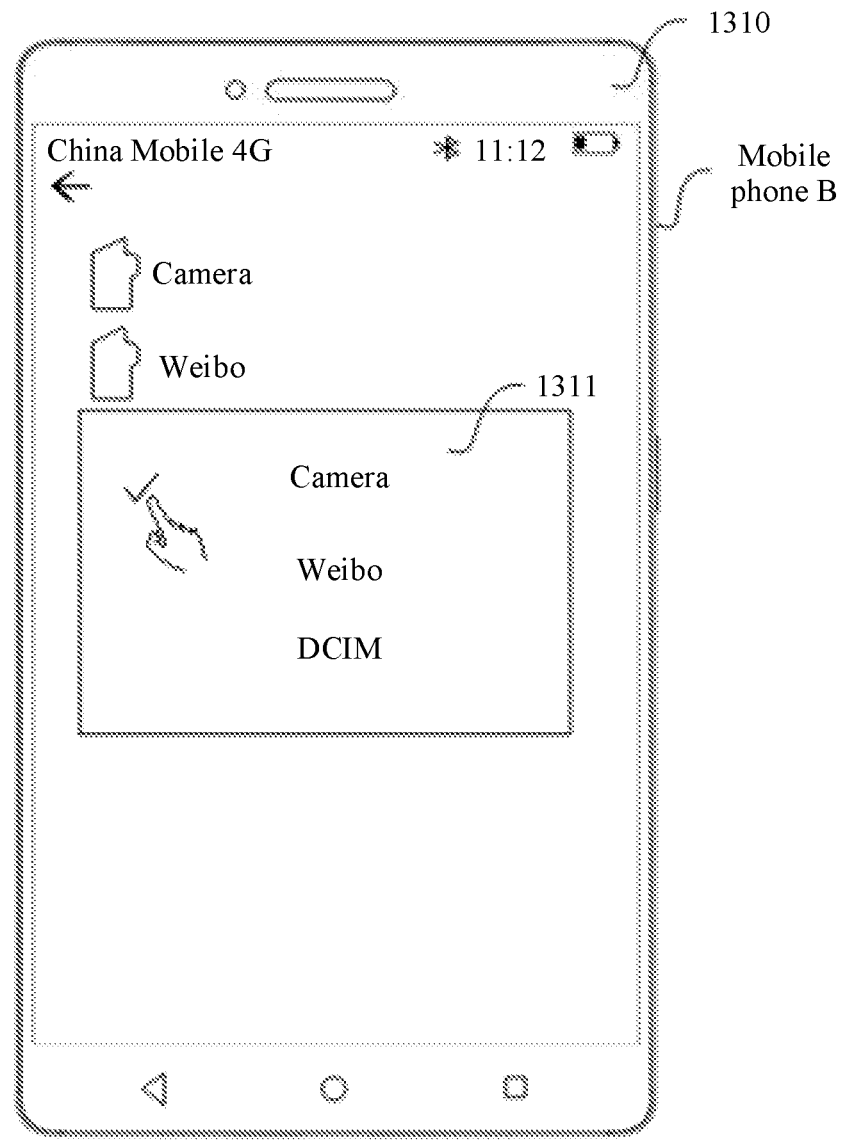

Further, in this embodiment of this application, the user B may alternatively perform an operation on the user interface displayed on the display of the mobile phone B. This improves user experience. FIG. 8A to FIG. 8E are used as an example. After the user A selects Camera on the user interface 830 displayed on the display of the mobile phone A, as shown in FIG. 13A and FIG. 13B, a user interface 1300 may be displayed on the display of the mobile phone B. The user interface 1300 includes a prompt box "Are you sure you want to store it in Camera" 1301, a button "Yes" 1302, and a button "No" 1303. The user B may select, based on a use habit of the user B or the like, whether to store a picture in the folder "Camera". If the user B taps "Yes", the picture is stored in the folder "Camera" on the mobile phone B. If the user B taps "No", a user interface 1310 may be displayed on the display of the mobile phone B. The user interface 1310 includes a list 1311 of all folders on the mobile phone B. The user B may select one of the folders, for example, select the folder "Camera". In this way, a picture to be shared by the mobile phone A may be stored in the folder "Camera" selected by the user B.

Certainly, it may be understood that the user interface opened by the mobile phone B in FIG. 13A and FIG. 13B is not limited to the folder directory interface shown in the figure, or may be an interface for displaying an application icon, or the like. This is not limited in this application.

In this embodiment of this application, file directory information or an interface of a terminal device at a file receive end is displayed on a terminal device at a file transmit end in a window form through projection, so that file sharing is implemented between a plurality of terminal devices through interaction between a plurality of windows. This simplifies a file sharing step.

Figure 14:
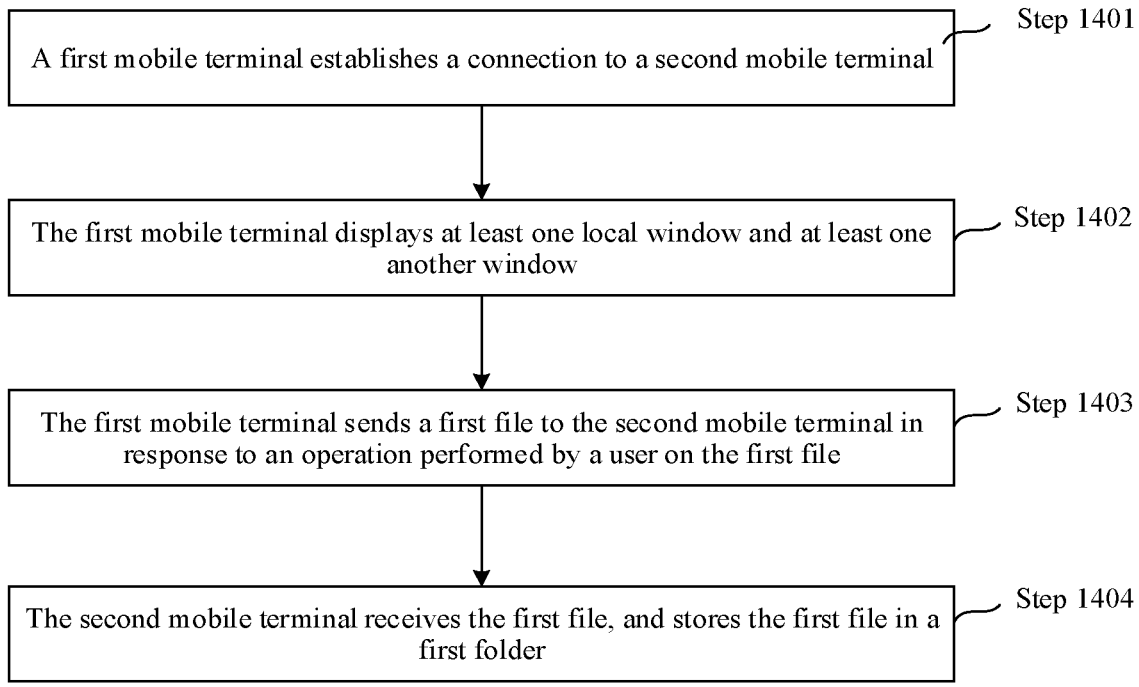
FIG. 14 is a flowchart of a file sharing method according to an embodiment of this application.

According to the foregoing embodiments, an embodiment of this application provides a file sharing method. The method is applied to a system including a first mobile terminal and a second mobile terminal. Structures of the first mobile terminal and the second mobile terminal involved in the method may be the structure of the electronic device 100 shown in FIG. 1. As shown in FIG. 14, the method includes the following steps.

Step 1401: The first mobile terminal establishes a connection to the second mobile terminal.

Step 1402: The first mobile terminal displays at least one local window and at least one another window.

The local window includes at least one first file stored in the first mobile terminal, the other window includes a file directory of the second mobile terminal, and the file directory includes at least a first folder.

In addition, the first file includes a multimedia file and/or a document. For example, the first file may be a picture, a video, or audio.

In this embodiment of this application, the file directory of the second mobile terminal included in the other window may be operated, or may be a picture.

Step 1403: The first mobile terminal sends the first file to the second mobile terminal in response to an operation performed by a user on the first file.

When the other window is an operable window, the operation performed by the user on the first file includes an operation that the user drags the first file to the first folder.

When the other window is an inoperable window, for example, a picture, the operation performed by the user on the first file includes a first operation performed by the user on the first file, for example, may be a touch and hold operation.

Step 1404: The second mobile terminal receives the first file, and stores the first file in the first folder.

In a possible implementation, the first folder may further include a second file stored in the second mobile terminal. The second mobile terminal may send the second file to the first mobile terminal in response to an operation performed by the user on the second file. In other words, when the other window is an operable window, the user may select a file stored in the second mobile terminal from the other window, and then send the file stored in the second mobile terminal to the first mobile terminal.

The file directory in the other window further includes a second folder. In this embodiment of this application, a storage location of the first file in the second mobile terminal may be determined in the following several manners.

In a first possible implementation, if a category of the first file is a first category, the second mobile terminal stores the first file in the first folder of the second mobile terminal, or if a category of the first file is a second category, the second mobile terminal stores the first file in the second folder of the second mobile terminal. In other words, it may be determined, based on the category of the first file, that the first file is stored in different folders.

In a second possible implementation, if a file name of the first file includes a first keyword, the second mobile terminal stores the first file in the first folder of the second mobile terminal, or if a file name of the first file includes a second keyword, the second mobile terminal stores the first file in the second folder of the second mobile terminal.

For example, the file name of the first file may include a keyword such as a person name or "camera".

In a third possible implementation, if an extension of the first file is a first extension, the second mobile terminal stores the first file in the first folder of the second mobile terminal, or if an extension of the first file is a second extension, the second mobile terminal stores the first file in the second folder of the second mobile terminal. For example, the extension may be mp3 or docx. For example, when the extension is docx, the first file may be stored in a folder named "Documents".

Further, in a possible implementation, the first mobile terminal may display first prompt information. The first prompt information is used to prompt at least one folder included in the picture of the file directory and prompt the user to select a third folder, and the third folder is a folder in the picture of the file directory.

When the directory in the other window is a picture, the user cannot directly drag a file in the local window to a folder in the other window. In this case, folders included in the picture may be displayed on the first mobile terminal, and then the user selects a folder and then stores the first file in the folder selected by the user.

In another possible implementation, the first mobile terminal displays a fourth folder, and the fourth folder is a folder in the picture of the file directory.

In this embodiment of this application, the first mobile terminal may determine a storage location of the first file based on a type, a file name, and the like of the first file, and then directly display the determined folder, or the first mobile terminal may display a storage path pre-selected by the user.

Further, the first mobile terminal displays second prompt information. The second prompt information is used to prompt the user that the first file cannot be sent to the second mobile terminal.

In this embodiment of this application, when the first mobile terminal has no permission to send a file to the second mobile terminal, prompt information may be displayed, to prompt the user that the file cannot be sent to the second mobile terminal. This achieves an objective of reminding the user.

According to the foregoing embodiments, this application further provides a file sharing method. The method is applied to a first mobile terminal. A structure of the first mobile terminal involved in the method may be the diagram of the structure of the electronic device 100 shown in FIG. 1. The method includes step 1401 to step 1403 shown in FIG. 14.

It should be noted that, for details of the steps performed by the first mobile terminal, refer to FIG. 14 and the descriptions of the foregoing embodiments. Details are not described herein again.

To implement functions in the method provided in the embodiments of this application, the mobile terminal device may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on specific applications and design constraints of the technical solutions.

Figure 15:
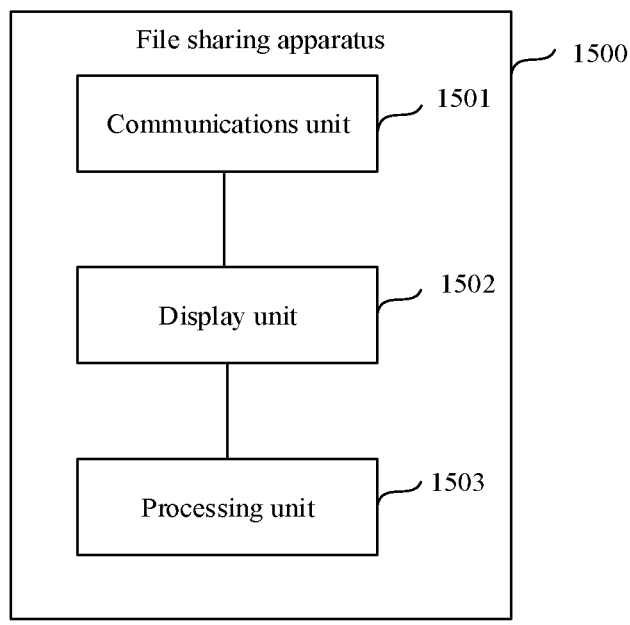
FIG. 15 is a block diagram of a structure of a file sharing apparatus according to an embodiment of this application.

According to the foregoing embodiments, some embodiments of this application further provide a file sharing apparatus. As shown in FIG. 15, a structure of the apparatus includes a communications unit 1501, a display unit 1502, and a processing unit 1503. The apparatus 1500 may be applied to a terminal device. The mobile terminal is applicable to the diagram of the structure of the mobile terminal device shown in FIG. 1, and may implement the file sharing method in the foregoing figures.

The communications unit 1501 is configured to establish a connection to a second mobile terminal.

The display unit 1502 is configured to display at least one local window and at least one another window. The local window includes at least one first file stored in the first mobile terminal, the other window includes a file directory of the second mobile terminal, and the file directory includes at least a first folder.

The processing unit 1503 is configured to send the first file to the second mobile terminal in response to an operation performed by a user on the first file.

Further, for specific execution steps performed by the foregoing units, refer to the descriptions in the foregoing embodiments. Details are not described herein again.

Figure 16:
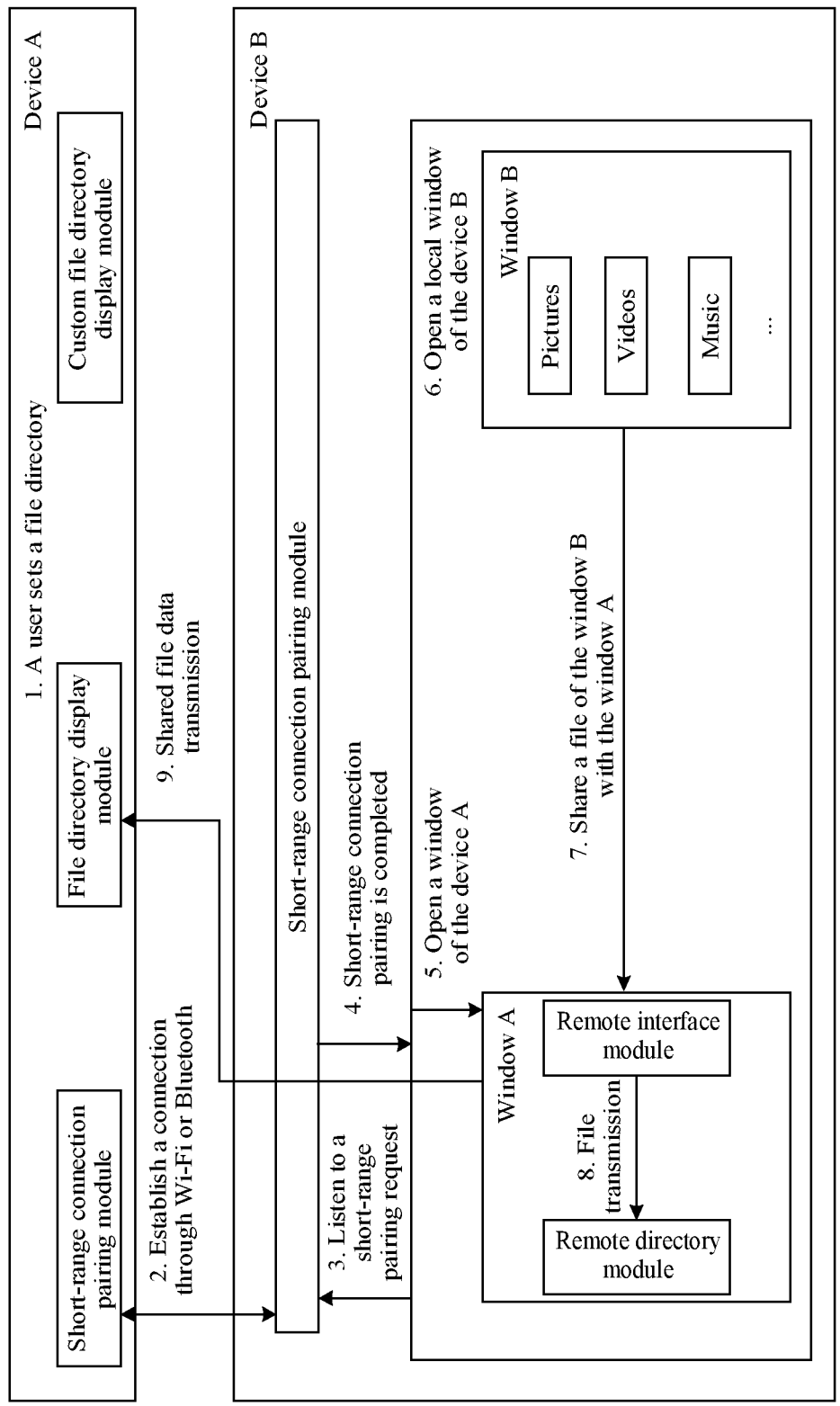
FIG. 16 is a schematic diagram of a file sharing apparatus according to an embodiment of this application.

FIG. 16 is a block diagram of a structure according to an embodiment of this application. As shown in FIG. 16, a user first sets a file sharing directory on a device A (a file receiving terminal device). The file sharing directory may also be understood as a file storage path that is set by the user on the device A. It is assumed that a device B is a file sending terminal device, and the device A and the device B may establish a connection through BLUETOOTH, WI-FI, or the like. In a process of establishing a connection between the device A and the device B, either of the devices may initiate a pairing connection request, and the other device receives and agrees to the pairing request. In this way, the device A and the device B can be paired and connected.

After the connection between the device A and the device B is completed, a plurality of windows may be displayed on a display of the device B. The plurality of windows includes a local window of the device B and a window of the device A. Then, the user may share a file with the device A on the display of the device B through interaction between the plurality of windows. It should be understood that the plurality of windows displayed by the device B include the local window and the window of the device A. The local window may display a local file or an interface of the device B. The window of the device A may display a file or an interface of the device A.

It should be noted that, in the schematic diagram shown in FIG. 16, a short-range connection pairing module may correspond to the communications unit 1501 shown in FIG. 15, and a file directory display module, a custom file directory display module, a remote directory module, and a remote interface module may correspond to the display unit 1502.

It should be noted that, in the embodiments of this application, division into the modules is an example and is merely logical function division, and may be other division during actual implementation. In addition, function units in the embodiments of this application may be integrated into one processing unit, or may exist alone physically, or two or more units may be integrated into one unit. The integrated unit may be implemented in a form of hardware, or may be implemented in a form of a software function unit.

When the integrated unit is implemented in the form of a software function unit and is sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the method described in the embodiments of this application. The foregoing storage medium includes any medium that can store program code, such as a USB flash drive, a removable hard disk, a read-only memory (ROM), a RAM, a magnetic disk, or an optical disc.

According to the foregoing embodiments, an embodiment of this application further provides a system. The system includes a first mobile terminal and a second mobile terminal. Further, for steps performed by the first mobile terminal and the second mobile terminal in the system, refer to the foregoing embodiments. Details are not described herein again.

Figure 17:
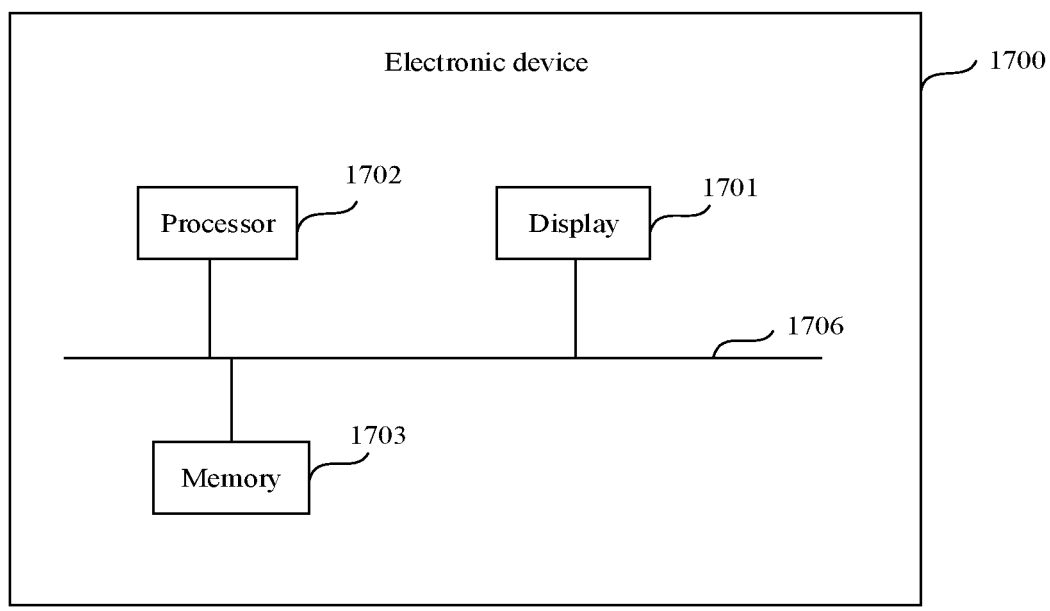
FIG. 17 is a schematic diagram of an electronic device according to an embodiment of this application.

According to the foregoing embodiments, an embodiment of this application further provides an electronic device. For example, the electronic device may be a first mobile terminal. The electronic device is configured to implement the file sharing method in the foregoing figures. As shown in FIG. 17, the electronic device 1700 may include a display 1701, one or more processors 1702, a memory 1703, a plurality of folders 1704 (not shown in the figure), and one or more computer programs 1705 (not shown in the figure). The foregoing components may be coupled through one or more communications buses 1706.

The display 1701 is configured to display a folder, a directory, a file identifier, and the like, and certainly may further display an icon of each application installed on the electronic device, a user interface when an application is opened, or the like. The memory 1703 stores one or more computer programs. The one or more computer programs includes instructions. The processor 1702 invokes the instructions stored in the memory 1703, so that the first mobile terminal 1700 performs the following steps.

The electronic device establishes a connection to a second mobile terminal.

The display 1701 displays at least one local window and at least one another window. The local window includes at least one first file stored in the first mobile terminal, the other window includes a file directory of the second mobile terminal, and the file directory includes at least a first folder.

The electronic device sends the first file to the second mobile terminal in response to an operation performed by a user on the first file.

In a possible implementation, the first file includes a multimedia file and/or a document, and the first folder includes a second file stored in the second mobile terminal.

In a possible implementation, the operation performed by the user on the first file includes an operation that the user drags the first file to the first folder.

In a possible implementation, when the file directory of the second mobile terminal included in the other window of the first mobile terminal is a picture, the operation performed by the user on the first file includes a first operation performed by the user on the first file.

In a possible implementation, when the instructions are executed by the electronic device, the electronic device 1700 is enabled to further perform the following step.

The display 1701 displays first prompt information. The first prompt information is used to prompt at least one folder included in the picture of the file directory and prompt the user to select a third folder, and the third folder is a folder in the picture of the file directory.

In a possible implementation, when the instructions are executed by the electronic device, the electronic device is enabled to further perform the following step.

The display 1701 displays a fourth folder, and the fourth folder is a folder in the picture of the file directory.

In a possible implementation, when the instructions are executed by the electronic device, the electronic device is enabled to further perform the following step.

The display 1701 displays second prompt information. The second prompt information is used to prompt the user that the first file cannot be sent to the second mobile terminal.

In this embodiment of this application, the processor 1702 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor, any conventional processor, or the like. The steps of the method disclosed in the embodiments of this application may be directly performed by a hardware processor, or may be performed by a combination of hardware in the processor and a software module. The software module may be located in the memory 1703. The processor 1702 reads the program instructions in the memory 1703, and completes the steps of the foregoing method in combination with hardware of the processor.

In this embodiment of this application, the memory 1703 may be a nonvolatile memory, such as a hard disk drive (HDD) or a solid-state drive (SSD), or may be a volatile memory, such as a RAM. The memory may alternatively be any other medium that can be used to carry or store desired program code in a form of an instruction or a data structure and that can be accessed by a computer. However, this is not limited thereto. The memory in this embodiment of this application may alternatively be a circuit or any other apparatus that can implement a storage function, and is configured to store instructions and/or data.

It may be clearly understood by a person skilled in the art that, for the purpose of convenient and brief description, for a specific working process of the electronic device 1700 shown in FIG. 17 after the embodiments of the present disclosure are implemented, refer to a corresponding process in the foregoing method embodiments. Details are not described herein again. For a more detailed structure and function of the electronic device 1700, refer to the detailed descriptions in the foregoing embodiments.

According to the foregoing embodiments, this application further provides a computer storage medium. The computer storage medium stores a computer program. When the computer program is executed by a computer, the computer is enabled to perform the embodiments shown in FIG. 3 to FIG. 14.

An embodiment of this application further provides a computer program product, including instructions. When the instructions are run on a computer, the computer is enabled to perform the embodiments shown in FIG. 3 to FIG. 14.

The embodiments of this application are described with reference to the flowcharts and/or block diagrams of the method, the device (system), and the computer program product according to the embodiments of this application. It should be understood that instructions may be used to implement each procedure and/or each block in the flowcharts and/or the block diagrams and a combination of a procedure and/or a block in the flowcharts and/or the block diagrams. These instructions may be provided for a general-purpose computer, a special-purpose computer, an embedded processor, or a processor of any other programmable data processing device to generate a machine, so that the instructions executed by the computer or the processor of another programmable data processing device generate an apparatus for implementing specific functions in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements specific functions in one or more processes in the flowcharts and/or in one or more blocks in the block diagrams.

These computer program instructions may alternatively be loaded onto a computer or another programmable data processing device, so that a series of operations and steps are performed on the computer or the other programmable device to generate computer-implemented processing. Therefore, the instructions executed on the computer or the other programmable device provide steps for implementing specified functions in one or more processes in the flowcharts and/or in one or more blocks in the block diagrams.

What is claimed is:

1. A method applied to a system, wherein the method comprises:
   establishing, by a first mobile terminal of the system, a connection to a second mobile terminal of the system;
   displaying, by the first mobile terminal, a local window and a second window, wherein the local window comprises a first file stored in the first mobile terminal, wherein the second window comprises a file directory of the second mobile terminal, and wherein the file directory comprises a first folder;
   receiving, by the first mobile terminal, a first operation by a user on the first file;
   displaying, by the first mobile terminal in response to the first operation on the first file, first prompt information prompting the user of at least one folder in the file directory including the first folder;
   sending, by the first mobile terminal in response to the user selecting the first folder in the first prompt information, the first file to the second mobile terminal;
   receiving, by the second mobile terminal, the first file; and
   storing, by the second mobile terminal, the first file in the first folder.

2. The method of claim 1, wherein the first folder comprises a second file stored in the second mobile terminal, and wherein the method further comprises:
   receiving, by the second mobile terminal, a second operation performed by the user on the second file; and
   sending, by the second mobile terminal in response to the second operation, the second file to the first mobile terminal.

3. The method of claim 1, wherein the file directory further comprises a second folder.

4. The method of claim 3, further comprising:
   storing, by the second mobile terminal, the first file in the first folder when a category of the first file is a first category; and
   storing, by the second mobile terminal, the first file in the second folder when the category is a second category.

5. The method of claim 1, further comprising:
   storing, by the second mobile terminal, the first file in the first folder when a file name of the first file comprises a first keyword; and
   storing, by the second mobile terminal, the first file in a second folder of the second mobile terminal when the file name comprises a second keyword.

6. The method of claim 1, further comprising:
   storing, by the second mobile terminal, the first file in the first folder when an extension of the first file is a first extension; and
   storing, by the second mobile terminal, the first file in a second folder of the second mobile terminal when the extension is a second extension.

7. The method of claim 1, wherein the first operation comprises a drag operation of the first file to the first folder.

8. The method of claim 1, wherein the first operation comprises a touch and hold operation.

9. The method of claim 8, further comprising displaying, by the first mobile terminal, first prompt information prompting the user of a second folder in the file directory and prompting the user to select the second folder.

10. A method, implemented by a first mobile terminal, wherein the method comprises:
   establishing a connection to a second mobile terminal;
   displaying a local window and a second window, wherein the local window comprises a first file stored in the first mobile terminal, wherein the second window comprises a file directory of the second mobile terminal, and wherein the file directory comprises a first folder;
   receiving a first operation by a user on the first file;
   displaying, in response to the first operation on the first file, first prompt information prompting the user of at least one folder in the file directory including the first folder; and
   sending, in response to the user selecting the first folder in the first prompt information, the first file to the second mobile terminal.

11. The method of claim 10, wherein the first file comprises a multimedia file or a document, and wherein the first folder comprises a second file stored in the second mobile terminal.

12. The method of claim 10, wherein the first operation comprises a drag operation of the first file to the first folder.

13. The method of claim 10, wherein the first operation comprises a touch and hold operation.

14. The method of claim 13, further comprising displaying first prompt information prompting the user of a second folder in a picture of the file directory and prompting the user to select the second folder.

15. A first mobile terminal comprising:
   a memory configured to store instructions; and
   a processor coupled to the memory, wherein when executed by the processor, the instructions cause the first mobile terminal to:
      establish a connection to a second mobile terminal;
      display a local window and a second window, wherein the local window comprises a first file stored in the first mobile terminal, wherein the second window comprises a file directory of the second mobile terminal, and wherein the file directory comprises a first folder;
      receive a first operation by a user on the first file;
      display, in response to the first operation on the first file, first prompt information prompting the user of at least one folder in the file directory including the first folder; and
      send, in response to the user selecting the first folder in the first prompt information, the first file to the second mobile terminal.

16. The first mobile terminal of claim 15, wherein the first file comprises a multimedia file or a document, and wherein the first folder comprises a second file stored in the second mobile terminal.

17. The first mobile terminal of claim 15, wherein the first operation comprises a drag operation of the first file to the first folder.

18. The first mobile terminal of claim 15, wherein the first operation comprises a touch and hold operation.

19. The first mobile terminal of claim 18, wherein when executed by the processor, the instructions further cause the first mobile terminal to display first prompt information prompting the user of a second folder in a picture of the file directory and prompting the user to select the second folder.

20. A computer program product comprising computer-executable instructions that are stored on a non-transitory computer-readable storage medium and that, when executed by a processor, cause a first mobile terminal to:
   establish a connection to a second mobile terminal;
   display a local window and a second window, wherein the local window comprises a first file stored in the first mobile terminal, wherein the second window comprises a file directory of the second mobile terminal, and wherein the file directory comprises a first folder;
   receive an operation by a user on the first file;
   display, in response to the operation on the first file, first prompt information prompting the user of at least one folder in the file directory including the first folder; and
   send, in response to the user selecting the first folder in the first prompt information, the first file to the second mobile terminal.

* * * * *